US 12,552,396 B1

(12) United States Patent
Semple et al.

(10) Patent No.: US 12,552,396 B1
(45) Date of Patent: Feb. 17, 2026

(54) OBJECT CONTROLLER VALIDATION

(71) Applicant: Zoox, Inc., Foster City, CA (US)

(72) Inventors: Tod Cameron Semple, Woodside, CA (US); Nathan David Shemonski, San Mateo, CA (US); Qiaosi Chen, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 714 days.

(21) Appl. No.: 17/229,622

(22) Filed: Apr. 13, 2021

(51) Int. Cl.
  *B60W 50/02* (2012.01)
  *B60W 50/00* (2006.01)
  *G06F 30/20* (2020.01)
  *G06F 119/02* (2020.01)

(52) U.S. Cl.
  CPC ......... *B60W 50/0205* (2013.01); *G06F 30/20* (2020.01); *B60W 2050/0031* (2013.01); *G06F 2119/02* (2020.01)

(58) Field of Classification Search
  None
  See application file for complete search history.

(56) References Cited

U.S. PATENT DOCUMENTS

| | | | | |
|---|---|---|---|---|
| 9,645,577 | B1 * | 5/2017 | Frazzoli | B60W 60/0011 |
| 10,012,984 | B2 * | 7/2018 | Berntorp | B60W 60/00276 |
| 11,086,318 | B1 * | 8/2021 | Davis | G05D 1/0257 |
| 11,126,763 | B1 * | 9/2021 | Gabrovski | G05D 1/0088 |
| 11,741,274 | B1 * | 8/2023 | Crego | G06N 7/01 |
| | | | | 703/8 |
| 12,030,509 | B1 * | 7/2024 | Nygaard | B60W 30/18163 |
| 2013/0120364 | A1 * | 5/2013 | Aldridge | A63F 13/34 |
| | | | | 345/419 |
| 2017/0161414 | A1 * | 6/2017 | Kible | G06F 30/20 |
| 2017/0286570 | A1 * | 10/2017 | Kim | G06F 11/3688 |
| 2019/0019412 | A1 * | 1/2019 | Roca | G01S 13/931 |

(Continued)

OTHER PUBLICATIONS

M. Barbier et al., "Validation of Perception and Decision-Making Systems for Autonomous Driving via Statistical Model Checking," 2019 IEEE Intelligent Vehicles Symposium (IV), Paris, France, 2019, pp. 252-259, doi: 10.1109/IVS.2019.8813793. (Year: 2019).*

(Continued)

*Primary Examiner* — Jelani A Smith
*Assistant Examiner* — Jacob Daniel Underbakke
(74) *Attorney, Agent, or Firm* — Lee & Hayes, P.C.

(57) ABSTRACT

Techniques for generating simulations to evaluate a performance of an object controller. The controller may be configured to control one or more functionalities of a simulated object (e.g., a "smart object") in a simulation, such as make the smart object operate like a human in a given scenario. A simulation system may generate one or more simulations based on log data captured by a vehicle operating in a physical environment. The simulation system may cause the object controller to control at least one smart object in the simulation, the smart object being representative of an actual object detected in the physical environment. The simulation system may compare a smart object trajectory to an actual object trajectory of the object to determine a performance metric associated with the object controller. Based on a determination that the performance metric satisfies a threshold, the simulation system may validate the object controller.

20 Claims, 8 Drawing Sheets

(56) References Cited

U.S. PATENT DOCUMENTS

| | | | | |
|---|---|---|---|---|
| 2019/0146492 | A1* | 5/2019 | Phillips | G05B 13/041 |
| | | | | 701/23 |
| 2019/0155291 | A1* | 5/2019 | Heit | B60W 30/00 |
| 2019/0243372 | A1* | 8/2019 | Huval | B60W 30/0953 |
| 2019/0278290 | A1* | 9/2019 | Zhang | G01S 7/40 |
| 2019/0369626 | A1* | 12/2019 | Lui | G05D 1/0221 |
| 2019/0384870 | A1* | 12/2019 | Shiraishi | G06Q 40/08 |
| 2020/0050536 | A1* | 2/2020 | Nygaard | G06F 11/3692 |
| 2020/0082038 | A1* | 3/2020 | Fang | G06F 30/20 |
| 2020/0094849 | A1* | 3/2020 | Weber | B60W 50/0225 |
| 2020/0180647 | A1* | 6/2020 | Anthony | B60W 50/0097 |
| 2020/0410063 | A1* | 12/2020 | O'Malley | G06F 11/3476 |
| 2021/0039662 | A1* | 2/2021 | Stayton | G05D 1/0088 |
| 2021/0104171 | A1* | 4/2021 | White | G06N 3/006 |
| 2021/0150228 | A1* | 5/2021 | Goforth | B60W 30/0956 |
| 2021/0229678 | A1* | 7/2021 | Wang | G06F 16/2322 |
| 2021/0261156 | A1* | 8/2021 | Ackenhausen | B60W 60/0011 |
| 2021/0276587 | A1* | 9/2021 | Urtasun | G06N 3/08 |
| 2021/0291862 | A1* | 9/2021 | Jiang | B60W 50/0098 |
| 2021/0370980 | A1* | 12/2021 | Ramamoorthy | G06F 18/214 |
| 2021/0387628 | A1* | 12/2021 | Wang | B60W 30/18163 |
| 2021/0390225 | A1* | 12/2021 | Yu | G06F 30/15 |
| 2022/0058309 | A1* | 2/2022 | Safira | G01S 17/10 |
| 2022/0076032 | A1* | 3/2022 | Jain | G06V 10/955 |
| 2022/0204009 | A1* | 6/2022 | Choi | G06F 11/3696 |
| 2022/0284627 | A1* | 9/2022 | Johnson | H04N 17/002 |

OTHER PUBLICATIONS

P. Kaur and R. Sobti, "Performance Evaluation of Multi-Target Object Trackers in IOT based autonomous intelligent vehicles," 2023 International Conference on Computational Intelligence and Knowledge Economy (ICCIKE), Dubai, United Arab Emirates, 2023, pp. 102-106, (Year: 2023).*

R. Kiesel, M. Streubühr, C. Haubelt, O. Löhlein and J. Teich, "Calibration and validation of software performance models for pedestrian detection systems," 2011 International Conference on Embedded Computer Systems: Architectures, Modeling and Simulation, Samos, Greece, 2011, (Year: 2011).*

D. Deter, C. Wang, A. Cook and N. K. Perry, "Simulating the Autonomous Future: A Look at Virtual Vehicle Environments and How to Validate Simulation Using Public Data Sets," in IEEE Signal Processing Magazine, vol. 38, No. 1, pp. 111-121, Jan. 2021, keywords: {Measuremen (Year: 2021).*

F. T. Johora and J. P. Muller, "Modeling Interactions of Multimodal Road Users in Shared Spaces," 2018 21st International Conference on Intelligent Transportation Systems (ITSC), Maui, HI, USA, 2018, pp. 3568-3574, (Year: 2018).*

A. A. Gorji, R. Tharmarasa and T. Kirubarajan, "Performance measures for multiple target tracking problems," 14th International Conference on Information Fusion, Chicago, IL, USA, 2011, pp. 1-8. (Year: 2011).*

* cited by examiner

OBJECT CONTROLLER VALIDATION

BACKGROUND

Vehicles are increasingly supplementing or replacing manual functionality with automatic controls. Autonomous driving may benefit from computing systems capable of making split-second decisions to respond to myriad events and scenarios, including vehicle reactions to dynamic objects operating in an environment of the vehicle. Simulations can be used to test and validate vehicle computing systems (e.g., control systems). For example, autonomous vehicles may use driving simulations to test and improve the performance of vehicle control systems with respect to how a vehicle interacts with dynamic objects (e.g., pedestrians, other vehicles, etc.). Driving simulations can be generated utilizing log data captured by vehicles operating in an environment, the log data including object data associated with an action or reaction of an object to a given scenario. However, the behavior of an object may very scenario dependent, and observed object movements in a given scenario may not accurately reflect how the object would move in a slightly modified scenario. As such, the object data captured in the log data may be insufficient or incomplete for vehicle control system analysis.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
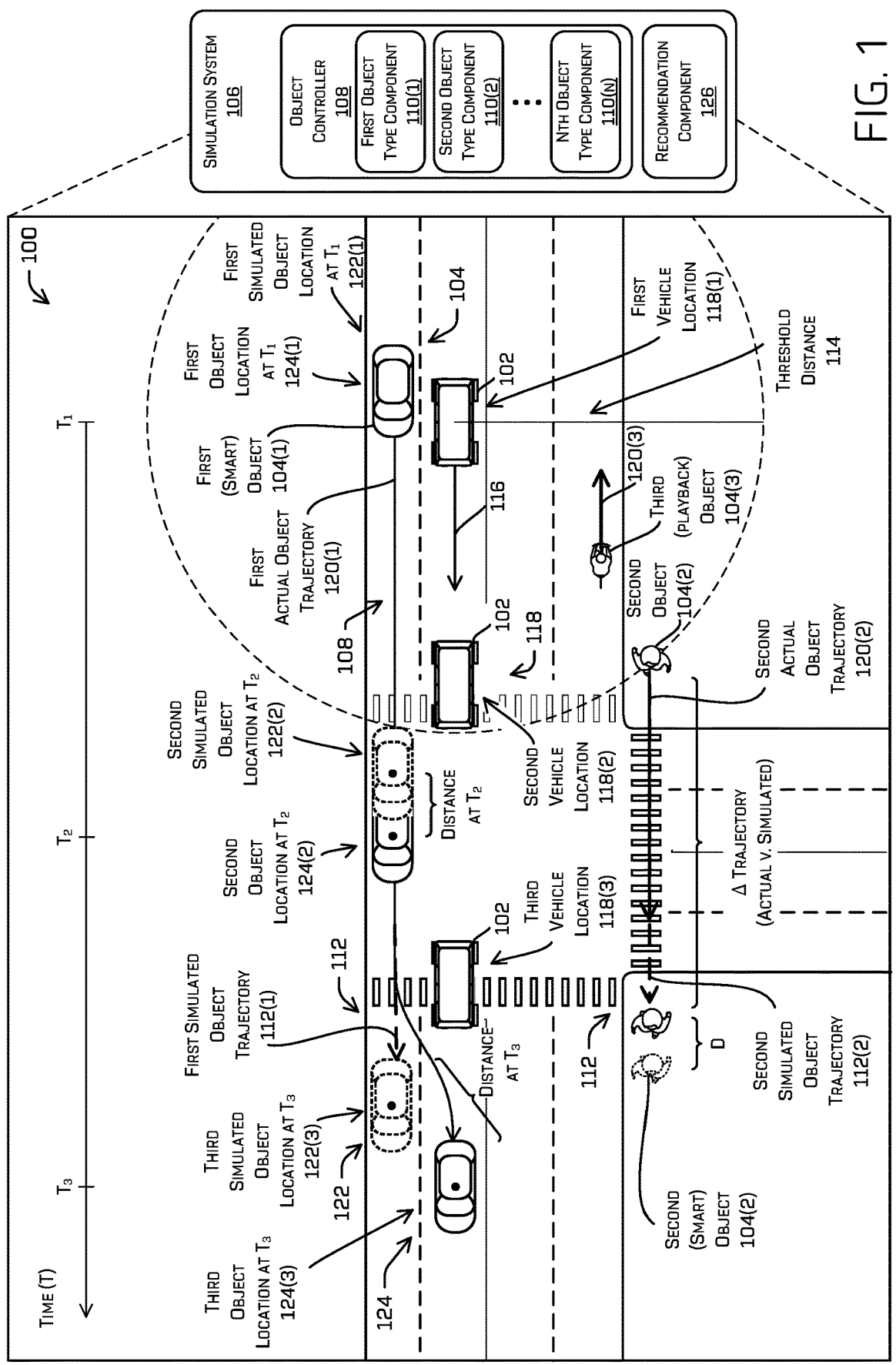
FIG. 1 is an illustration of a vehicle and multiple objects in a simulation in which a simulation system may be utilized to evaluate a performance of an object controller controlling a simulated object, in accordance with examples of this disclosure.

As discussed above, behavior of objects in an environment may be very scenario dependent and log data representing behavior of an object in one scenario may not be representative of how the object would behave in a slightly different scenario. Therefore, log data may be insufficient or incomplete for vehicle control system analysis.

This application relates to techniques for executing log-based driving simulations (e.g., simulations modeled after log data captured by real vehicles traversing an environment) to evaluate the functionalities and performance of an object controller. As used herein, an object controller is a model configured to control behavior of a simulated object in a simulation. Some techniques described herein include performing simulations using a simulation system configured to execute the object controller and evaluate the performance of the object controller in controlling movement of one or more simulated objects (e.g., "smart objects") in a dynamic simulated environment, the simulated object(s) representing actual objects (e.g., human controlled objects, pedestrians, etc.) in a physical environment. The object controller may be configured to make operating decisions associated with the smart object(s), such as to determine directions and/or speeds (e.g., trajectories) for the smart object(s) to travel, that simulate the way in which the actual objects might be expected to behave in the physical environment. For example, the object controller may detect a potential interaction of a smart object with another object in the simulation and may modify a trajectory to avoid the interaction. The simulation system may perform the simulation and evaluate a performance of the object controller controlling the smart object, as compared to what a real human associated with the object did in the physical environment as represented in log data. Based at least in part on the performance, the simulation system may determine whether to validate the object controller or parameters for a certain object/scenario type.

In various examples, the simulation system may access log data associated with a vehicle operating in a physical environment, such as that stored in a database associated with the simulation system. The log data may include data logged (e.g., captured, calculated, etc.) by the vehicle while operating in the physical environment. In various examples, the log data may include object data associated with one or more objects detected in the environment. The objects may include static objects (e.g., buildings, bridges, signs, etc.) and/or dynamic objects such as other vehicles (e.g., cars, trucks, trains, etc.), pedestrians, bicyclists, or the like. Unless otherwise indicated, the term "object" hereinafter refers to dynamic objects.

In various examples, the simulation system may generate one or more simulations based on the log data. In various examples, the simulation system may generate simulations utilizing techniques such as those described in U.S. patent application Ser. No. 16/376,842, filed Apr. 5, 2019 and entitled "Simulating Autonomous Driving Using Map Data and Driving Data," U.S. patent application Ser. No. 16/555,988, filed Aug. 29, 2019 and entitled "Vehicle Controller Simulations," U.S. patent application Ser. No. 17/184,128, filed Feb. 24, 2021 and entitled "Agent Conversions in Driving Simulations," U.S. patent application Ser. No. 17/184,169, filed Feb. 24, 2021 and entitled "Simulating Agents based on Driving Log Data," the entire contents of which are incorporated herein by reference for all purposes.

A simulation of the one or more simulations may be associated with a portion of a log (e.g., vehicle trip (e.g., cycle from start to stop), portion of vehicle trip, etc.) corresponding to the log data. In some examples, the portion of the log may represent a period of time (e.g., 20 seconds, 30 seconds, 45 seconds, etc.) that is less than a total time associated with the log. For example, a simulation may include a 30 second period of time (e.g., snippet) of a 40-minute log associated with a vehicle operating in a physical environment, though this is just an example and other periods of time associated with the simulation and/or log are contemplated herein.

The simulation may include a playback vehicle (e.g., simulated vehicle operating based on the log data that may not deviate from the log data) and one or more simulated objects representative of objects detected in the physical environment. In some examples, the simulation system may determine the simulated object(s) to include in the simulation based on a proximity to the vehicle in the physical environment as represented in the log data. In such examples, based on a determination that the associated objects operated within a threshold distance of the vehicle in the physical environment, the simulation system may include corresponding simulated objects in the simulation. At least one of the simulated object(s) may include a smart object that is configured to be controlled by the object controller. In some examples, the simulation may additionally include one or more playback objects (e.g., simulated object operating based on the log data). In some examples, the simulation system may determine a number of smart objects to include in the simulation based on an object controller and/or portion thereof to be evaluated. The smart objects may deviate from the respective positions indicated by the log data by being semi-autonomously controlled by the object controller.

In some examples, the object controller may be configured to control a smart object in a simulation based on an object type associated therewith. The object type may include an object class (e.g., four-wheeled object (e.g., car, truck, etc.), two-wheeled object (e.g., bicycle, etc.), pedestrian, etc.) and/or an object sub-class (e.g., sedan, bus, petty cab, streetcar, electric bicycle, articulated vehicle, train, etc.). In at least one example, the object controller may be configured to control smart objects representative of humans operating cars, bicycles, and themselves (e.g., pedestrians).

In various examples, the simulation system may perform (e.g., run) the simulation, with the object controller controlling at least one smart object in the simulation. The simulation system may perform the simulation for the period of time and may evaluate a performance of the object controller controlling the at least one smart object in the simulation. In some examples, the simulation system may compare simulated object data (e.g., movement of the smart object through the simulation) to the object data associated with a respective actual object (e.g., object data associated with the log data).

In various examples, the simulation system may determine a value of a performance metric (e.g., metric) associated with a performance of the object controller. The value of the metric may represent an efficacy of the object controller to control the at least one object in the simulation in a manner similar to a respective actual object. In other words, the metric may represent a capability of the object controller to control a simulated object in a human-like manner. The metric may relate to locations, trajectories, velocities, accelerations, and/or yaws associated with the smart object and the object at a particular time.

In some examples, the simulation system may determine the value of the metric based on a comparison between the locations, trajectories, velocities, accelerations and/or yaws associated with the smart object and the object (e.g., log data). In some examples, the simulation system may determine the value of the metric for a particular smart object at a particular time of the simulation. In some examples, the particular time may include a last time interval prior to an end of the simulation or a last time interval of the simulation in which the particular smart object is relevant to the vehicle (e.g., within a threshold distance thereof). For example, a smart object may be within a threshold distance of the vehicle for a portion of the period of time of a simulation (e.g., five seconds of a thirty second simulation). The simulation system may determine a value of the metric associated with the smart object at a last time in which the smart object was relevant to the vehicle, such as by comparing simulated data associated with the smart object to log data associated with the object at the time.

In some examples, the simulation system may be configured to determine values of the metric for each smart object at periodic time intervals (e.g., every 0.1 second, every 1 second, etc.) during the simulation. In some examples, the simulation system may determine the values of the metric at the time intervals in which each smart object is relevant to the vehicle. In some examples, the value of the metric for the particular smart object may include an average (e.g., mean, median, mode) value of metrics associated with two or more times in the simulation. For example, the simulation system may determine values of the metric associated with a smart object at periodic time intervals of at least a portion of the simulation and may calculate an average value associated with the object controller controlling the smart object. In some examples, the value of the metric for the particular smart object may include a maximum distance that a simulated object location differed from an actual object location in the simulation. For example, the simulation system may determine distances between an actual object location and a simulated object location at corresponding times throughout a simulation. The simulation system may determine the value of the metric based on a maximum distance between the actual object location and the simulated object location.

In some examples, the simulation system may determine a value of the metric associated with the object controller controlling a smart object of a particular object type. The simulation system may determine the values of the metric associated with one or more smart objects of the particular type and may calculate an average or a maximum performance metric value for the particular type. In various examples, the performance metric may represent an overall metric associated with the object controller controlling one or more smart object in a simulation. In examples in which the object controller is configured to control a single type of smart object in the simulation, the overall metric may be the same as the metric associated with the particular object type. In examples in which the object controller is configured to control two or more smart objects of different object types, the overall metric for the object controller may include an average metric associated with the two or more smart objects.

Additionally or in the alternative, the overall performance metric may be determined based on weighted metrics associated with different smart objects in a simulation. In such examples, the simulation system may be configured to evaluate the overall performance of the object controller based on different weighting factors. Non-limiting examples of the weighting factors include distance to the vehicle, time an object is present in a simulation, and the like. For example, the simulation system may weight metrics associated with objects that are in close proximity to the vehicle greater than metrics associated with objects that are farther away from the vehicle. For another example, the simulation system may weight metrics associated with an object that is present in a simulation (e.g., within a threshold distance of the vehicle and thus included in the simulation) for less than a threshold period of time (e.g., less than 20 seconds, less than 1 minute, etc.) lower than metrics associated with another object that is present in the simulation for more than the threshold period of time. In some examples, the weighting factors may include a step weighting factor, such as 1.0 associated with a first threshold time or distance, 1.1 for a second threshold time or distance, 1.2 for a third threshold time or distance, and the like, though this is merely an example and different weighting factors are contemplated herein.

In various examples, the performance metric may represent an aggregate (e.g., overall) metric associated with the object controller controlling one or more smart objects over a plurality of simulations. Individual simulations of the plurality of simulations may represent portions of the log associated with the vehicle operating in the physical environment. As an illustrative example, the simulation system may generate each simulation to represent 30 second portions of the log. In such an example, the simulation system may generate (80) 30-second simulations over a forty (40) minute log, though this is merely an illustrative example and is not intended to be so limiting. In various examples, the simulation system may perform each simulation of the plurality of simulations and may determine a value of the metric associated with the object controller controlling one or more smart objects in each simulation. In some examples, the simulation system may determine the aggregate metric associated with the object controller based on an average value of the metric associated with each simulation of the plurality of simulations. In some examples, the simulation system may determine the aggregate metric associated with the object controller based on a maximum value of the metric associated with the plurality of simulations (e.g., maximum distance that a simulated object deviated from the actual object).

In some examples, the simulation system may be configured to determine that no objects are relevant to the vehicle during a portion of time associated with the log. In such examples, the simulation system may determine to not generate a simulation associated with the portion of time in which no objects are relevant to the vehicle. Continuing the example from above, the simulation system may determine that a first and a second portion of time (e.g., a first minute) of the forty-minute log does not include relevant objects but a third portion of time does include a relevant object. The simulation system may determine to generate a first simulation associated with the log based on the third portion of time (e.g., starting at one minute into the log). By limiting simulation generation to portions of a log that include relevant objects, the simulation system may reduce a total amount of computing resources associated with the object controller evaluation, thereby improving the functioning of an associated computing device.

In various examples, the simulation system may be configured to output metrics (e.g., values of one or more metrics) associated with the performance of the object controller controlling one or more smart objects in one or more simulations. In various examples, the simulation system may be configured to determine whether to validate the object controller based on the metrics. In some examples, based on a determination that a value associated with a metric does not satisfy a threshold (e.g., is equal to or greater than the threshold difference), the simulation system may identify an error associated with the object controller. In some examples, the simulation system may be configured to determine that an average or maximum value of the metric does not satisfy a threshold. In such examples, the simulation system may determine an error associated with an overall performance of the object controller. In some examples, the simulation system may determine that a value associated with a metric corresponding to a control of a particular type of object does not satisfy the threshold. In such examples, the simulation system may determine that the error is associated with control of the particular object type.

In some examples, the simulation system may be configured to determine that a value of the metric associated with a particular time interval does not satisfy a threshold associated with a particular time interval. In such examples, the simulation system may identify a deviation above a threshold at the particular time interval. In some examples, simulation system may be configured to determine the error based on the deviation above the threshold at the particular time interval.

In various examples, the simulation system may output an indication of the error. In some examples, the simulation system may be configured to generate a recommendation including a mitigating action to perform to correct the error (e.g., fix the error, reduce the value of the metric, improve object controller performance, etc.). In such examples, the simulation system may output the recommendation, such as to provide the recommendation to a computing device associated with a programmer of the object controller. In some examples, the recommendation may include information associated with the error, metrics associated with the evaluation, and one or more mitigating actions to perform to correct the error.

In some examples, based on a determination that a value associated with a metric (e.g., a difference between the respective locations, trajectories, velocities, accelerations and/or yaws) satisfies a threshold (e.g., is equal to or less than a threshold difference), the simulation system may validate the object controller. For example, the value may represent an average and/or maximum distance between locations of the smart object and locations of the object at various times in the simulation(s). Based on a determination that the average and/or maximum distance is less than a threshold distance, the simulation system may validate the object controller. For another example, the metric may relate to trajectories of the simulated object and/or the actual object and the difference may represent a difference in one or more values associated with the respective trajectories. Based on a determination that value(s) associated with the simulated object trajectory and the actual object trajectory (e.g., velocity, direction, acceleration, etc.) are within a threshold difference of one another, the simulation system may determine to validate the object controller.

In various examples, the simulation system may be configured to output an indication of validity of the object controller. In some examples, based on a determination of object controller validity, the simulation system may utilize the object controller in additional simulations used to test a vehicle controller, such as those configured to control autonomous or semi-autonomous vehicles. In various examples, the simulation system may incorporate the object controller into simulations generated to evaluate the performance of vehicle controllers, such as those described in the U.S. Patent Applications incorporated herein above as well as U.S. patent application Ser. No. 17/136,938 filed Dec. 29, 2020 and entitled "Vehicle Controller Validation," the entire contents of which are incorporated herein by reference for all purposes.

The techniques discussed herein may improve the functioning of a simulation computing system (e.g., simulation system) in many ways. For example, the simulation system described herein may be configured to evaluate the performance of the smart objects operating within a threshold distance of the vehicle. The simulation system may withdraw from consideration (e.g., ignore) data associated with objects that are outside the threshold distance (e.g., not relevant to the vehicle). As such, the simulation system may limit a number of objects controlled by the object controller and thus a total amount of data to process in an evaluation of the object controller. Additionally, by considering data associated with the control of relevant objects, the simulation system may reduce a total amount of noise associated with the performance calculations, thereby increasing the accuracy of the performance metrics. Accordingly, the simulation computing system may be configured to reduce an amount of data used in the evaluation while improving the accuracy thereof, thereby improving the performance of the simulation computing system in validating an object controller.

Once validated, the object controller may control one or more smart objects that may be introduced into additional simulations for testing the performance of a vehicle computing system, such as to determine how the vehicle computing system would react to an object in a particular scenario. At least because the smart objects may be included in a simulation in which a real object did not exist, the techniques described herein enable an increased breadth of scenario evaluation. As such, the techniques described herein may improve the safety of autonomous vehicle operations.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1 is an illustration of a vehicle 102 and objects 104 in a simulation 100 in which a simulation system 106 may be utilized to test an object controller 108, in accordance with examples of this disclosure. In various examples, one or more of the functions of the simulation system 106 may be performed by one or more computing devices 334 of FIG. 3.

The object controller 108 may be configured to control (e.g., make operating decisions for) one or more simulated objects (e.g., smart objects) in a dynamic simulated environment, such as first object 104(1) and second object 104(2). In various examples, the object controller 108 may be configured to control the smart object(s) in a human-like manner, such as to represent how a human would act in a particular situation. In various examples, the object controller 108 may be configured to control the smart object(s) based on an object type associated therewith. The object type may include an object class (e.g., four-wheeled object (e.g., car, truck, etc.), two-wheeled object (e.g., bicycle, etc.), pedestrian, etc.) and/or an object sub-class (e.g., sedan, bus, petty cab, streetcar, electric bicycle, articulated vehicle, train, etc.). In at least one example, the object controller may be configured to control smart objects representative of humans operating cars, bicycles, and themselves (e.g., pedestrians).

In the illustrative example, the object controller 108 includes object type components 110, each configured to control one or more smart object(s) of a particular type. For example, a first object type component 110(1) may control the first object 104(1) of a first type (e.g., car), a second object type component 110(2) may control the second object 104(2) of a second type (e.g., pedestrian), and an Nth object type component 110(N) may control an Nth smart object of an Nth type. In other examples, the object controller 108 may include a greater or lesser number of object type components 110, such as to control greater or lesser number of object types.

In various examples, the object controller 108 may be configured to control a path of the smart object(s) through the simulated environment, such as to determine a simulated object trajectory 112 associated with a particular smart object. For example, the object controller 108 may determine a first simulated object trajectory 112(1) associated with the first object 104(1) and a second simulated object trajectory 112(2) associated with the second object 104(2). The simulated object trajectories 112 may include a direction of travel, velocity, acceleration, and the like, used by the object controller 108 to control respective smart objects.

In various examples, the object controller 108 and/or the object type component 110 associated therewith may determine one or more parameters associated with a particular smart object. The parameter(s) may include a velocity profile (e.g., lateral and/or longitudinal), an acceleration profile (e.g., lateral and/or longitudinal), a yaw profile, and/or other movement profiles (e.g., delay time at a stop sign, yielding behaviors, etc.). The object controller 108 and/or the object type component 110 may determine the parameter(s) utilizing techniques, such as those described in U.S. patent application Ser. Nos. 16/555,988 and 17/184,128, the entire contents of which are incorporated herein by reference above for all purposes. In some examples, object controller 108 and/or the object type component 110 may determine the parameter(s) based on the object type. In some examples, the object controller 108 and/or the object type component 110 may determine the parameter(s) based on observed operating behaviors associated with the actual object corresponding to the particular smart object. In such examples, the object controller 108 and/or object type component 110 may be configured to process log data to determine the operating behaviors associated with the particular smart object. The operating behaviors may include a level of aggressive behavior (e.g., in a spectrum of conservative to aggressive behaviors), a level of law abiding behavior (e.g., coming to a complete stop at a stop sign, rolling through stop signs, operating within speed limits, etc.), and/or other behaviors associated with humans operating in a physical environment.

In various examples, the object controller 108 and/or the object type component 110 may determine the simulated object trajectory 112 for the particular smart object based on the parameter(s). In such examples, the object controller 108 may be configured to most closely emulate the actual human-operated object associated therewith. In various examples, the object controller 108 and/or the object type component 110 may be configured to control the smart object(s) according to default parameters. The default parameters may include parameter(s) associated with average object behaviors (e.g., average speed, average accelerations, average amount of jerk, average yaw, average yaw rate, etc.). In various examples, the default parameters may be applied based on a determination that a level of observed behavior of an object (e.g., based on log data) is equal to or less than a threshold level. For example, the default parameters may be used applied to a first object 104(1) based on a determination that the level of aggressive behavior associated with the first object 104(1) is equal to or less than a threshold level of aggressive behavior.

In various examples, the object controller 108 may determine whether to apply default parameter(s) and/or parameter(s) associated with observed behaviors to one or more smart objects in the simulation 100 based on an object controller 108 and/or portion thereof to be evaluated. In some examples, the simulation system 106 may be configured to evaluate a performance of an object controller 108 and/or a portion thereof (e.g., object type component 110) periodically (e.g., daily, weekly, monthly, etc.), and/or intermittently, such as responsive to receiving a request to perform an evaluation. In various examples, the simulation system may be configured to receive requests to validate the object controller 108 via a user interface associated therewith and/or from another computing device. For example, a manager of the simulation system may submit a request to evaluate a performance of an object controller 108 via a user interface associated with the simulation system, such as prior to utilizing the object controller 108 in a simulation to evaluate a vehicle control system. For another example, a programmer may update an object controller 108 and may send, from a remote computing device to the simulation system, a request to evaluate the performance of the updated object controller.

In some examples, responsive to determining to evaluate the object controller 108, the simulation system 106 may access log data associated with an operation of a vehicle in a physical environment (e.g., a log). The log data may include data logged (e.g., captured, calculated, etc.) by the vehicle 102 while operating in the physical environment. In various examples, the log data may include object data associated with the objects 104 detected in the physical environment. In various examples, the object data may include an object type previously determined by a vehicle computing system, such as by utilizing classification and/or segmentation. The object data may additionally or alternatively include position, orientation, and trajectory data (e.g., location and movement data) associated with each detected object 104. For example, the object data may include one or more locations, velocities, accelerations, jerks, yaw angles, yaw rates, and/or the like associated with each object 104.

In various examples, the object data may include location and movement data associated with each detected object 104 at periodic time intervals throughout the log. In some examples, the object data may include the location and movement data associated with objects 104 that are determined to be relevant to the vehicle 102. In some examples, the object data may include the location and movement data associated with objects 104 at time intervals in which the detected objects 104 are relevant to the vehicle 102. In various examples, an object 104 may be relevant to the vehicle based on a determination that the object 104 is within a threshold distance 114 of the vehicle 102 in the environment. Additionally or in the alternative, object relevance may be determined based on a predicted object trajectory and/or a vehicle trajectory 116, and/or by utilizing techniques such as those described in U.S. patent application Ser. No. 16/389,720, filed Apr. 19, 2019 and entitled "Dynamic Object Relevance Determination," and U.S. patent application Ser. No. 16/530,515 filed Aug. 2, 2019 and entitled "Relevant Object Detection," the entire contents of which are incorporated herein by reference for all purposes. In some examples, the simulation system 106 may receive object data associated with each of the detected objects 104 in the environment and may identify one or more relevant objects 104 based on the threshold distance 114. For example, the simulation system 106 may determine that the first object 104(1), the second object 104(2), and the third object 104(3) are within the threshold distance of the vehicle 102 and are thus relevant to the vehicle 102.

In various examples, the simulation system may generate the simulation 100 for evaluating the performance of the object controller 108. In some examples, the simulation system 106 may generate the simulation 100 based on the log data. In various examples, the simulation system may generate simulations utilizing techniques such as those described in U.S. patent application Ser. Nos. 16/376,842, 16/555,988, 17/184,128, and 17/184,169, incorporated herein by reference above for all purposes. The simulation may be associated with a portion of a log (e.g., vehicle 102 trip (e.g., cycle from start to stop), portion of vehicle 102 trip, etc.) corresponding to the log data. In some examples, the portion of the log may represent a period of time (e.g., 20 seconds, 30 seconds, 45 seconds, etc.) that is less than a total time associated with the log. For example, a simulation 100 may include a 30 second period of time (e.g., snippet) of a 40-minute log associated with the vehicle 102 operating in the physical environment. Though this is just an example and other periods of time associated with the simulation 100 and/or log are contemplated herein.

In various examples, the simulation 100 may be one of a plurality of simulations associated with a log and generated to evaluate the performance of the object controller 108. In some examples, a number of simulations 100 used to evaluate the performance of the object controller 108 may be determined based on the log data, such as based on a total time associated therewith. In some examples, the number of simulations may include a pre-determined number (e.g., 20, 100, 150, etc.) associated with evaluating the performance of the object controller 108. In some examples, the pre-determined number of simulations may be based on a number of simulations in a log that include an object 104 that is relevant to the vehicle 102 and/or includes objects 104 of a particular object type associated with an evaluation of the object controller 108.

The vehicle 102 may represent a simulated vehicle (e.g., a playback vehicle) that operates based on the log data and one or more simulated objects 104 representative of actual objects detected in the physical environment. The vehicle 102 may have associated therewith one or more vehicle trajectories 116 by which the vehicle 102 actually traveled through the physical environment. For example, the vehicle 102, traveling along a vehicle trajectory 116 may be located at a first vehicle location 118(1) at a first time, a second vehicle location 118(2) at a second time, and a third vehicle location 118(3) at a third time.

In some examples, the simulation system 106 may determine one or more objects 104 to include in the simulation 100 based on a relevance to the vehicle 102, such as that described above and in the U.S. Patent Applications incorporated herein by reference above. In such examples, object(s) 104 determined to be relevant to the vehicle 102 may be included in the simulation 100. In some examples, the simulation system 106 may determine the one or more objects 104 (e.g., simulated objects representative of actual detected objects) to include in the simulation 100 based on the proximity to the vehicle 102. In various examples, the object(s) 104 included in the simulation 100 may include those that are located within a threshold distance 114 of the vehicle 102 at a time during the simulation 100. For example, at a first time ($T_1$) the simulation system 106 determines that the first object 104(1), the second object 104(2), and the third object 104(3) are located within the threshold distance 114 from the vehicle 102. Accordingly, the simulation system 106 may include the first object 104(1), the second object 104(2), and the third object 104(3) in the simulation, at least at the first time ($t_1$).

In various examples, at a later time in the simulation (e.g., after the first time ($T_1$)), the simulation system 106 may determine that one or more of the previously considered objects 104 are no longer within the threshold distance 114 of the vehicle 102. Based on the determination that a location associated with a previously considered object 104 is equal to or greater than the threshold distance 114, the simulation system 106 may withdraw object data associated with the previously considered object 104 from consideration during an evaluation of the object controller 108. For example, at the third object 104(3) traveling in an opposite direction to the vehicle 102 may be at a location outside the threshold distance 114 from the vehicle 102 at a third time ($T_3$) (e.g., when the vehicle is at the third vehicle location 118(3). Accordingly, the simulation system 106 may withdraw object data associated with the third object from consideration (e.g., calculations, etc.) at and beyond the third time ($t_3$).

In various examples, at least one object 104 of the object(s) may include a smart object that is configured to be controlled by the object controller 108. In the illustrative example, the first object 104(1) and the second object 104(2) represent smart objects that may be controlled by the object controller 108 in the simulation 100. In other examples, a greater or lesser number of objects 104 may be controlled by the object controller 108 in the simulation 100. Additionally, and as illustrated in FIG. 1, the simulation 100 may include one or more playback objects, such as the third object 104(3). The playback object may include a simulated object that is operated based on the log data (e.g., how the actual object operated in the physical environment.). In other examples, the simulation 100 may include a greater or lesser number of playback objects.

In various examples, the simulation system may perform (e.g., run) the simulation 100 with the object controller 108 controlling the at least one smart object. As discussed above, the object controller 108 may include object type components 110, each of which may be configured to control objects 104 of a particular object type or class. For example, the first object type component 110(1) may be configured to control cars and thus may control the first (smart) object 104(1) and the second object type component 110(2) may be configured to control pedestrians and thus may control the second (smart) object 104(2).

In controlling the respective smart objects, the object controller 108 may make operational decisions, such as to determine a direction of travel, speed, acceleration, jerk, and the like associated with the smart objects, such as first object 104(1) and second object 104(2). In various examples, the object controller 108 may be configured to determine a simulated object trajectory 112 associated with the smart objects 104. For example, the object controller 108 may determine a first simulated object trajectory 112(1) associated with the first object 104(1) and a second simulated object trajectory 112(2) associated with the second object 104(2).

In various examples, the smart objects may travel through a simulated environment associated with the simulation 100 (e.g., representative of the physical environment corresponding to the log data) according to the respective simulated object trajectories 112. In various examples, a playback object, such as the third object 104(3), may travel through the simulated environment based on an actual object trajectory 120 associated with the log data, such as based on a third actual object trajectory 120(3) associated with the third object 104(3).

In various examples, the simulation system 106 may determine a value of a performance metric (e.g., metric) associated with a performance of the object controller. The value of the metric may represent an efficacy of the controller to control the smart object(s) in the simulation in a manner similar to respective actual objects (e.g., as compared to the log data (e.g., object data associated therewith)). In other words, the metric may represent a capability of the object controller to control a simulated object in a human-like manner. The metric may relate to locations, trajectories, velocities, accelerations, and/or yaws associated with the smart object and the object at a particular time.

In some examples, the simulation system 106 may determine the metric based on a comparison of a simulated object trajectory 112 and an actual object trajectory 120. In such examples, the simulation system 106 may compare one or more values (e.g., direction of travel, magnitude of speed, acceleration, jerk, etc.) associated with each of the simulated object trajectory 112 and the actual object trajectory 120 to determine the performance metric. For example, the simulation system 106 may compare a second actual object trajectory 120(2) and/or one or more values associated therewith to associated value(s) of a second simulated object trajectory 112(2). Based on the comparison, the simulation system 106 may determine a performance metric associated with the object controller controlling the second object 104(2).

In various examples, the simulation system 106 may determine a difference between the actual object trajectory 120 and the simulated object trajectory 112 at a periodic interval (e.g., every 0.5 seconds, every 1.5 seconds, etc.) during the simulation 100. In some examples, the simulation system may determine the difference between the trajectories 112 and 120 based on a determination that the associated object is within the threshold distance 114 of the vehicle 102, such as at a particular time interval (e.g., $T_1$, $T_2$, $T_3$, etc.) in the simulation. In various examples, the metric associated with a particular time interval may be based on the difference between the trajectories 112 and 120.

In some examples, the simulation system 106 may determine the metric based on a determined distance between simulated object locations 122 and actual object locations 124 (illustrated as object locations 124) at one or more times during the simulation 100. In some examples, the one or more times may include times after an initial time associated with the simulation (e.g., a time at which the actual object location 124 and the simulated object location 122 are a same location). In the illustrative example, the simulation 100 is initiated at a first (e.g., initial) time ($T_1$) at which the first object location 124(1) and the first simulated object location 122(1) are a same location. As such, the simulation system 106 may determine between simulated object locations 122 and actual object locations 124 beginning at a second time ($T_2$) after the first time ($T_1$).

In some examples, the one or more times may include times in which at least one of a simulated object location 122 and/or an actual object location 124 is within a threshold distance 114 of the vehicle 102 (e.g., object 104 is relevant to the vehicle 102). In at least one example, the simulation system 106 may determine values of the metric based on a determined distance between the simulated object locations 122 and the actual object locations 124 at a periodic interval, such as every 0.2 seconds, every 1.1 second, or the like. For example, the simulation system 106 may determine a first distance between a second simulated object location at a second time ($T_2$) and a second actual object location at the second time ($T_2$) and a second distance between a third simulated object location at a third time ($T_3$) and a third actual object location at the third time ($T_3$). The simulation system 106 may determine the values of the metric associated with the second time and the third time based on the first distance and the second distance.

In various examples, the simulation system 106 may determine a value of the metric associated with simulation based on average and/or maximum values of the metrics determined at each time interval. In some examples, the simulation system 106 may determine a metric associated with each object type component 110. In such examples, the simulation system 106 may be configured to determine an average and/or maximum metric associated with the object controller 108 controlling a particular object type. For example, the simulation system 106 may determine a metric associated with a first object type component 110(1) based on an average and/or maximum of a first distance at ($T_2$) and a second distance at ($T_3$) associated with a first object type (e.g., car). For another example, the simulation system 106 may determine the metric associated with a second object type component 110(2) based on an average and/or maximum distance between actual and simulated locations associated with the second object 104(2).

In various examples, the simulation system 106 may be configured to determine a total value of the metric associated with the simulation 100. In some examples, the total value of the metric may include an average and/or maximum value of the metric across different types of smart objects. For example, the total value of the metric for the simulation 100 may include an average and/or maximum value of the metric associated with the object controller controlling a car (e.g., the first object 104(1)) and a pedestrian (e.g., the second object 104(2)).

In various examples, the simulation system 106 may be configured to output metrics (e.g., values of one or more metrics) associated with the performance of the object controller 108 controlling the smart object(s) in the simulation 100. In various examples, the simulation system 106 may be configured to determine whether to validate the object controller based on the metrics. In some examples, based on a determination that a value associated with a metric does not satisfy a threshold (e.g., is equal to or greater than the threshold difference), the simulation system 106 may identify an error associated with the object controller 108. In some examples, the simulation system may be configured to determine that an average and/or maximum value of the metric does not satisfy a threshold. In such examples, the simulation system may determine an error associated with an overall performance of the object controller 108. In some examples, the simulation system may determine that a value associated with a metric corresponding to an object type component 110 does not satisfy the threshold. In such examples, the simulation system may determine that the error is associated with control of an associated particular object type.

In some examples, the simulation system 106 may be configured to determine that a value of the metric associated with a particular time interval (e.g., time ($T_3$)) does not satisfy a threshold associated with a particular time interval. In such examples, the simulation system 106 may identify a deviation above a threshold at the particular time interval. In some examples, simulation system may be configured to determine the error based on the deviation above the threshold at the particular time interval.

In various examples, the simulation system 106 may output an indication of the error. In some examples, the simulation system 106 may include a recommendation component 126 that is configured to generate a recommendation for correcting the error. In such examples, the simulation system 106 may be configured output the recommendation, such as to provide the recommendation to a computing device associated with a programmer of the object controller. In some examples, the recommendation component 126 be configured to identify one or more potential actions to perform to mitigate the error (e.g., fix the error, reduce the value of the metric, improve object controller performance, etc.). In such examples, the recommendation component 126 may include the potential action(s) in the recommendation.

In some examples, based on a determination that a value associated with a metric (e.g., a difference between the respective locations, trajectories, velocities, accelerations and/or yaws) satisfies a threshold (e.g., is equal to or less than a threshold difference), the simulation system may validate the object controller 108. For example, the value may represent an average and/or maximum distance between simulation object locations 122 and actual object locations 124 at various times in the simulation 100. Based on a determination that the average and/or maximum distance is less than a threshold distance, the simulation system 106 may validate the object controller 108. For another example, the metric may relate to trajectories and the difference may represent a difference in one or more values associated with the simulated object trajectories 112 and the actual object trajectory 120. Based on a determination that value(s) associated with the simulated object trajectory 112 and the actual object trajectory 120 (e.g., velocity, direction, acceleration, etc.) are within a threshold difference of one another, the simulation system 106 may determine to validate the object controller 108.

In some examples, the simulation system 106 may be configured to output an indication of validity of the object controller 108. In some examples, based on a determination of object controller 108 validity, the simulation system 106 may utilize the object controller 108 in additional simulations used to test a vehicle controller, such as those configured to control autonomous or semi-autonomous vehicles. In various examples, the simulation system 106 may incorporate the object controller 108 into simulations 100 generated to evaluate the performance of vehicle controllers, such as those described in the U.S. Patent Applications incorporated herein above.

Figure 2:
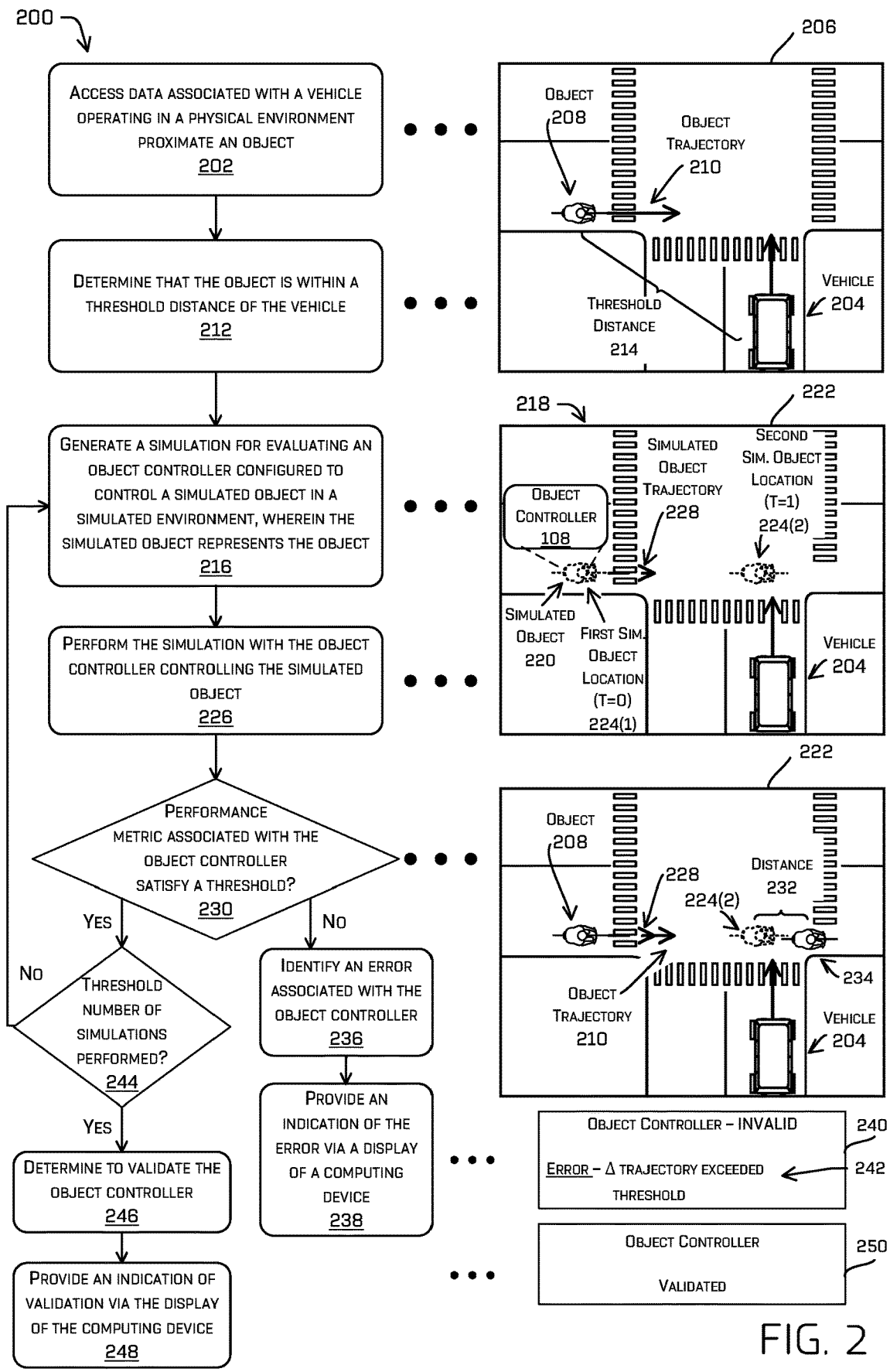
FIG. 2 illustrates a process for determining whether to validate an object controller based at least in part on performance metrics associated with a performance of the object controller controlling a simulated object, in accordance with examples of this disclosure.

FIG. 2 illustrates a process 200 for determining whether to validate an object controller 108 based at least in part on performance metrics associated therewith, in accordance with examples of this disclosure.

At operation 202, a simulation system, such as simulation system 106, accesses data associated with a vehicle 204, such as vehicle 102, operating in a physical environment 206 proximate an object 208, such as object 104. In various examples, the simulation system may access the data based on an instruction or request to evaluate the object controller 108. In some examples, the simulation system may be configured to periodically (e.g., every 24 hours, every week, etc.) evaluate the performance of the object controller 108. In such examples, the instruction may be received based on a periodic evaluation cycle. In some examples, the simulation system may receive a request to evaluate the object controller 108, such as from a remote computing device or via a user interface associated with the simulation system. In various examples, the request may be sent to or input into the simulation system based on a software and/or hardware update to a component associated with the object controller 108. In response to receiving the request (or instruction), the simulation system may access the data.

The data may include log data associated with the vehicle traversing the physical environment 206. The log data may include data observed and/or perceived by the vehicle 204, such as data identifying characteristics of the physical environment 206, the object 208 (and/or other objects) detected in proximity to the vehicle 204, attributes of characteristics of the physical environment, the object 208 and/or other objects (e.g., classifications, sizes, shapes, positions, locations, trajectories, velocities, accelerations, jerks, etc.).

In some examples, the log data may include object data including data associated with operations and/or behaviors of the object 208 and/or the other objects. In some examples, the log data may include event data associated with events observed by the vehicle 204, such as accidents or near accidents, traffic violations, crossing or jaywalking pedestrians, cyclists, or animals, weather anomalies, construction zones, detours, school zones, and the like. The events and/or object behaviors may be designated from a list of events and/or object behaviors that are useful for driving simulations. In some examples, the event data and/or object data including the operations and/or behaviors of the object 208 may be used to determine a level of aggressive behavior data (e.g., in a spectrum of conservative to aggressive behaviors), a level of law abiding behavior (e.g., coming to a complete stop at a stop sign, rolling through stop signs, operating within speed limits, etc.), and/or other behaviors associated with the object 208 (e.g., human operating in the physical environment 206).

In some examples, the data (e.g., object data associated therewith) may include an object type of the object 208. The object type may include an object class (e.g., four-wheeled object (e.g., car, truck, etc.), two-wheeled object (e.g., bicycle, etc.), pedestrian, etc.) and/or an object sub-class (e.g., sedan, bus, petty cab, streetcar, electric bicycle, articulated vehicle, train, etc.). In the illustrative example, the data may include an indication that the object type of the object 208 is a two-wheeled bicycle, though this is merely an example, and other classes and sub-classes of objects are contemplated herein.

In various examples, the data may include an object trajectory 210 associated with the object. The object trajectory 210 may include a direction of travel, a speed, an acceleration, a jerk, or the like of the object 208 at a particular time during the log. In some examples, the data may include a plurality of object trajectories 210 associated with a plurality of times of the log. In at least one example, the plurality of times may include times at a periodic interval. In various examples, the data may include locations, positions, and/or orientations of the object 208 associated with an operation of the object 208 in the physical environment 206.

At operation 212, the simulation system determines that the object 208 is within a threshold distance 214, such as threshold distance 114, of the vehicle 204. The threshold distance 214 may include a distance associated with object relevance to the vehicle 204. The object relevance may represent a relationship or potential relationship between the vehicle 204 and the object 208, such that an action of one could potentially result in a reaction by the other. In other words, the proximity between the vehicle 204 and the object 208 could potentially result in an interaction between the vehicle 204 and the object 208 (e.g., unplanned movements (e.g., yielding motion, lane change, etc.) in reaction to one another).

At operation 216, the simulation system generates a simulation 218 for evaluating the object controller 108 configured to control a simulated object 220 in a simulated environment 222, wherein the simulated object 220 represents the object 208. In various examples, the simulation 218 may be generated based at least in part on the request or instruction to evaluate the object controller 108 described above. The simulation system may generate the simulation 218 based on the data (e.g., log data), such as utilizing the techniques described in the U.S. Patent Applications incorporated herein by reference above.

In various examples, the simulation 218 may be associated with a vehicle log (e.g., vehicle trip (e.g., cycle from start to stop), portion of vehicle trip, etc.) corresponding to the data. The simulation 218 may represent the log or a portion thereof. In some examples, the portion of the log may represent a period of time (e.g., 25 seconds, 30 seconds, 40 seconds, etc.) that is less than a total time associated with the log. For example, a simulation 218 may include a 30 second period of time (e.g., snippet) of a 20-minute log associated with a vehicle 204 operating in the physical environment 206. Though this is just an example and other periods of time associated with the simulation 218 and/or log are contemplated herein.

The simulation 218 may include the vehicle 204 operating in play back, such as that based on the data (e.g., actual movement in the physical environment 206) and the simulated object 220 that represents the actual object 208 operating in the physical environment. In some examples, the simulation system includes the simulated object 220 in the simulation 218 based on a determination that the object 208 associated therewith operated within the threshold distance 214 of the vehicle 204 at a time during the log that is associated with the simulation 218. In the illustrative example, the simulated object 220 is a "smart object" that is configured to be controlled by the object controller 108 in the simulation 218.

In some examples, the simulation 218 may additionally include one or more playback objects, such as playback object 104(3) of FIG. 1. The playback object(s) may be simulated objects that operate in the simulated environment 222 based on the data. In some examples, the simulation system may determine a number of smart objects to include in the simulation 218 based on the object controller 108 and/or portion thereof to be evaluated. At least one of the detected objects in the physical environment 206 may be a smart object that is configured to be controlled by the object controller 108.

In various examples, the object controller 108 may control the simulated object 220 from a first simulated object location 224(1) (e.g., at an initial time, T=0) through the simulated environment 222 based on the object type associated with the associated object 208. In some examples, the object controller 108 may be configured to determine one or more accelerations, velocities, yaw rates and/or yaw angles, and the like based on the object type associated with the object 208.

In various examples, the object controller 108 may be configured to control the simulated object 220 based on one or more parameters. In some examples, the object controller 108 may determine the parameters based in part on the object type. The parameter(s) may include a velocity profile (e.g., lateral and/or longitudinal), an acceleration profile (e.g., lateral and/or longitudinal), a yaw profile, and/or other movement profiles (e.g., delay time at a stop sign, yielding behaviors, etc.). The object controller 108 may determine the parameter(s) utilizing techniques, such as those described in U.S. patent application Ser. Nos. 16/555,988 and 17/184,128, the entire contents of which are incorporated herein by reference above. In some examples, the object controller 108 may determine the parameter(s) based on observed operating behaviors associated with the object 208 operating in the physical environment 206. In some examples, the operating behaviors (e.g., the level of aggressive behavior, the level of law-abiding behavior, and/or other behaviors associated with the object 208) may be included in the data, such as in the object data of the log data. In some examples, the object controller 108 may be configured to process the data to determine the operating behaviors associated with the object 208. Accordingly, in some examples, the object controller 108 may be configured to control the simulated object 220 based on observed behaviors. In such examples, the object controller 108 may cause the simulated object 220 to move in a manner that most closely emulates the actual human-operated object 208.

In various examples, the object controller 108 may be configured to control the simulated object 220 according to default parameters. The default parameters may include parameter(s) associated with average object behaviors (e.g., average speed, average accelerations, average amount of jerk, average yaw, etc.). In various examples, the default parameters may be applied based on a determination that a level of observed behavior of an object (e.g., based on log data) is equal to or less than a threshold level.

In various examples, the simulation system may generate the simulation based on a particular scenario associated with the log. In such examples, the simulation system may be configured to determine a performance of the object controller 108 in controlling the simulated object 220 in the particular scenario. In some examples, the simulation system may determine the particular scenario based on the request. In such examples, the request may include an indication of the particular scenario to include in the evaluation of the object controller 108 (e.g., in the simulation 218). In some examples, the scenario may include a particular action of the vehicle 204 or the object 208 (e.g., lane change, adjusting a position in a lane, speed adjustment, etc.) or an interaction between the vehicle 204 and the object 208 in the physical environment 206 (e.g., yields, etc.). In some examples, the scenario may include particular characteristics associated with the physical environment, such as curved roads, hills, four-way stops, two-way stops, and the like. In various examples, the simulation system may identify the particular scenario and may determine a period of time associated with one or more logs that include the particular scenario. In such examples, the simulation system may generate the simulation 218 to include at least a portion of the period of time of a log that includes the particular scenario.

At operation 226, the simulation system performs (e.g., runs) the simulation with the object controller 108 controlling the simulated object 220. Though illustrated as including the vehicle 204, this is merely for illustrative purposes and the simulation 218 may not include the vehicle 204, but instead, a simulation thereof. The object controller 108 may make control decisions associated with the simulated object 220, such as to cause the simulated object 220 to move from the first simulated object location 224(1) at an initial time (e.g., time (T)=0) to the second simulated object location 224(2) at a first time (e.g., time (T)=1) in the simulation 218, according to a simulated object trajectory 228, such as simulated object trajectory 112.

The simulation system may determine performance metrics (e.g., metrics) associated with a performance of the object controller 108 controlling the simulated object 220 through the simulated environment 222. In various examples, the simulation system may determine the metrics associated with a plurality of times of the simulation 218. The plurality of times may be times associated with a periodic time interval. Though illustrated as having an initial time (T=0) and a first time (T=1), this is merely for illustrative purposes, and the simulation 218 may have a greater number of times associated therewith.

In various examples, the simulation system may determine a value of a metric at the first time based on a difference between the second simulated object location 224(2) and an actual object location associated with the object at the first time (e.g., actual object location 124). In some examples, the simulation system may determine the value of metric associated with the first time based on a difference between the simulated object trajectory 228 and the object trajectory 210 at the first time (e.g., difference between a direction of travel, speed, acceleration, jerk, etc.). Accordingly, the metric (and value thereof) may relate to locations, velocities, accelerations, jerks, positions and/or orientations associated with the simulated object 220 as compared to those associated with the object 208.

At operation 230, the simulation system determines whether a performance metric associated with the object controller satisfies the threshold. The metric may represent a difference between a movement of the simulated object 220 in the simulated environment 222 and the object 208 in the physical environment. As such, the metric may represent an efficacy of the object controller 108 to control the simulated object 220 in a human-like manner.

In various examples, the threshold may be determined based on an object type associated with the object 208. For example, the simulation system may determine the threshold based on a determination that the object 208 is a bicyclist. The threshold may include a threshold associated with a particular time interval, two or more intervals of the simulation 218, and/or a plurality of simulations. For example, the simulation system may be configured to determine whether a distance 232 between a second simulated object location 224(2) and an actual object location 234 at the first time meets or exceeds a threshold. For another example, the simulation system may be configured to determine whether a value associated with a simulated object trajectory 228 is greater than a threshold value different from the object trajectory 210 at a particular time. For yet another example, the simulation system may determine whether an average and/or maximum value of a plurality of metrics associated with the simulation 218 meets or exceeds a threshold value.

Based on a determination that the metric associated with the object controller 108 does not satisfy the threshold ("No" at operation 230), the simulation system, at operation 236, identifies an error associated with the object controller 108. In some examples, the simulation system may be configured to determine a portion of the object controller 108 associated with the error. In some examples, the simulation system may be configured to determine an object type associated with the error. For example, the simulation system may determine the error based on a determination that a difference in a velocities associated with trajectories 228 and 210 associated with the simulated object 220 and the bicycle object 208 at one or more times of the simulation exceeds a threshold velocity difference (e.g., in direction of travel and/or speed) for a bicycle.

At operation 238, the simulation system may provide an indication of the error 240 via a display of a computing device. In some examples, the computing device may be associated with the request. In such examples, the simulation system may be configured to send the indication of the error 240 to the requesting computing device, such as via electronic mail, an application, a pop-up notification on a user interface, or the like. In the illustrative example, the indication of the error 240 includes the words "OBJECT CONTROLLER INVALID," as well as a description 242 of the error. However, this is not intended to be so limiting and the indication of the error 240 may include evaluation results, metrics, detected differences in movement between the simulated object 220 and the object 208, and/or other information about the simulation 218, results, or the like.

Based on a determination that the metric associated with the object controller 108 does satisfy the threshold ("Yes" at operation 230), the simulation system, at operation 244, determines whether the threshold number of simulations have been performed. In some examples, the threshold number of simulations may include a number of simulations associated with the log. In such examples, the threshold number may be determined based on a length of time of the log and/or a period of time associated with each simulation (e.g., 20 seconds, 30 seconds, 60 seconds, 2 minutes, etc.). In some examples, the threshold number may be determined based on lengths of time associated with two or more logs used in the evaluation of the object controller 108.

In some examples, the threshold number may include a pre-determined number of simulations (e.g., 55, 85, 120, etc.) used in the evaluation of an object controller 108. In some examples, the threshold number may be determined based on the object controller 108 and/or portion thereof to be evaluated. In such examples, the simulation system may determine threshold number based on the particular object controller 108 and/or the portion thereof to be evaluated. For example, the evaluation may include an evaluation of the performance of the object controller 108 to control a particular type of object. The threshold number of simulations may be determined based on the particular type of object. In some examples, the threshold number may be determined based on a scenario associated with the evaluation. In such examples, the simulation system may determine the scenario to be evaluated and may determine the number of simulations associated therewith.

Based on a determination that the threshold number of simulations have not yet been performed ("No" at operation 244), the simulation system may generate a second simulation for evaluating the object controller 108, such as that described above at operation 216. Based on a determination that the threshold number of simulations have been performed ("Yes" at operation 244), the simulation system, at operation 246 may determine to validate the object controller 108. In various examples, based on a determination that the object controller 108 is valid, the simulation system may cause the object controller to control one or more smart objects in additional simulations generated to evaluate a performance of a vehicle controller (e.g., autonomous vehicle controller).

At operation 248, the simulation system may provide an indication of validation 250 via the display of the computing device. In some examples, the simulation system may cause the indication of validation 250 to be presented via a user interface of the simulation system. As discussed above, simulation system may cause the indication of validation 250 to be presented on the display of the computing device associated with the request to evaluate the performance of the object controller 108. In the illustrative example, the indication of validation 250 includes the words "OBJECT CONTROLLER VALIDATED." However, this is not intended to be so limiting and the indication of validation 250 may include evaluation results, metrics, detected differences in movement between the simulated object 220 and the object 208, and/or other information about the simulation 218, results, or the like.

Figure 3:
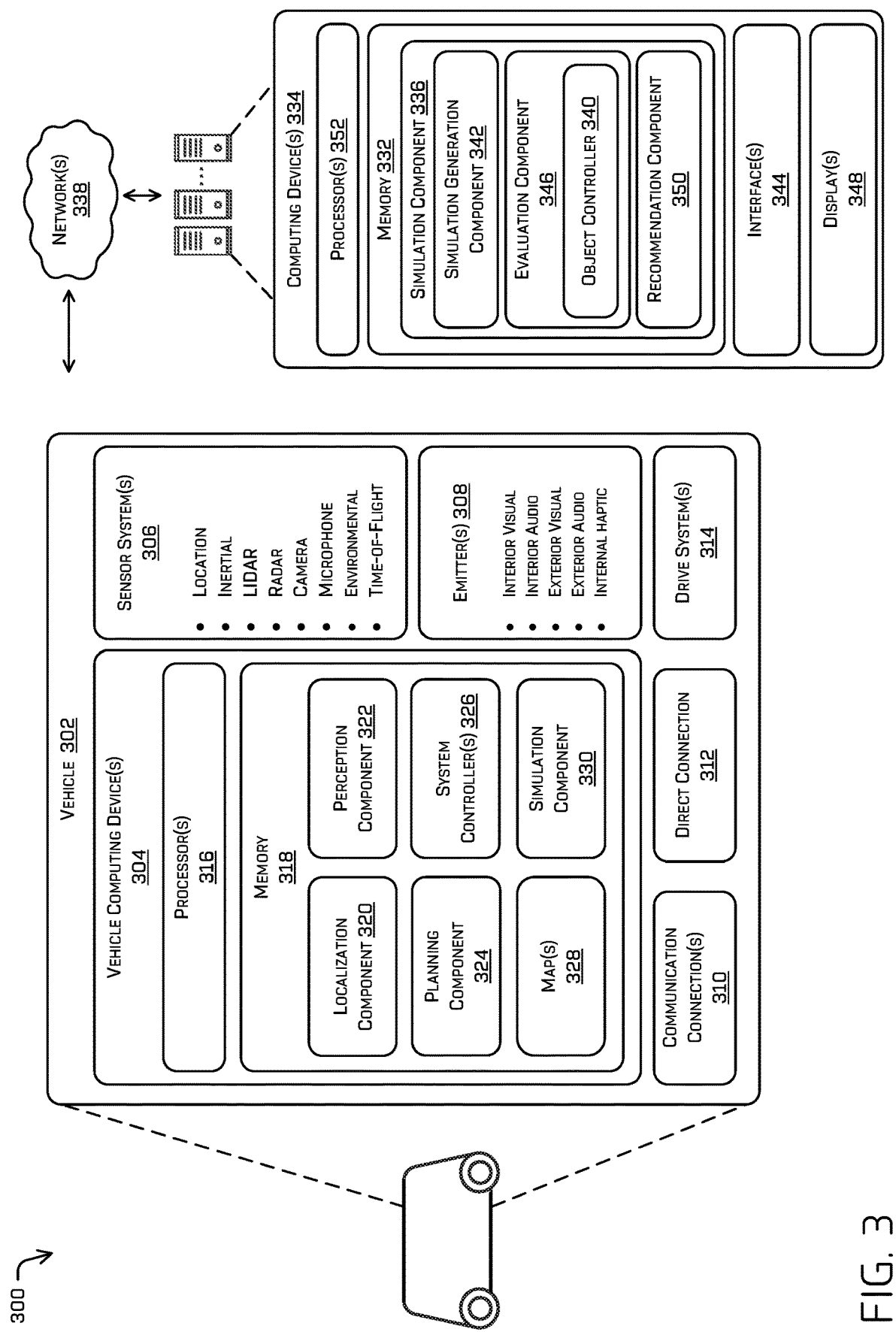
FIG. 3 is a block diagram of an example system for implementing the techniques described herein.

FIG. 3 is a block diagram of an example system 300 for implementing the techniques described herein. In at least one example, the system 300 may include a vehicle 302, such as vehicle 102 and vehicle 204. The vehicle 302 may include one or more vehicle computing devices 304, one or more sensor systems 306, one or more emitters 308, one or more communication connections 310, at least one direct connection 312, and one or more drive systems 314.

The vehicle computing device(s) 304 may include one or more processors 316 and memory 318 communicatively coupled with the one or more processors 316. In the illustrated example, the vehicle 302 is an autonomous vehicle; however, the vehicle 302 could be any other type of vehicle, such as a semi-autonomous vehicle, or any other system having at least an image capture device (e.g., a camera enabled smartphone). In the illustrated example, the memory 318 of the vehicle computing device(s) 304 stores a localization component 320, a perception component 322, a planning component 324, one or more system controllers 326, one or more maps 328, and a simulation component 330. Though depicted in FIG. 3 as residing in the memory 318 for illustrative purposes, it is contemplated that the localization component 320, a perception component 322, a planning component 324, one or more system controllers 326, one or more maps 328, and the simulation component 330 may additionally, or alternatively, be accessible to the vehicle 302 (e.g., stored on, or otherwise accessible by, memory remote from the vehicle 302, such as, for example, on memory 332 of one or more computing devices 334). For example, the memory 332 may store a simulation component 336 accessible by the planning component 324 of the vehicle 302 for generating one or more simulations associated with operation of the vehicle 302.

In at least one example, the localization component 320 may include functionality to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment, such as from map(s) 328, and may continuously determine a location and/or orientation of the autonomous vehicle within the map. In some instances, the localization component 320 may utilize SLAM (simultaneous localization and mapping), CLAMS (calibration, localization and mapping, simultaneously), relative SLAM, bundle adjustment, nonlinear least squares optimization, or the like to receive image data, lidar data, radar data, IMU data, GPS data, wheel encoder data, and the like to accurately determine a location of the autonomous vehicle. In some instances, the localization component 320 may provide data to various components of the vehicle 302 to determine an initial position of an autonomous vehicle for determining the relevance of an object to the vehicle 302, as discussed herein.

In some examples, the perception component 322 may include functionality to perform object detection, segmentation, and/or classification. In some examples, the perception component 322 may provide processed sensor data that indicates a presence of an object (e.g., entity) that is proximate to the vehicle 302 and/or a classification of the object as an object type (e.g., car, pedestrian, cyclist, animal, building, tree, road surface, curb, sidewalk, unknown, etc.). In some examples, the perception component 322 may provide processed sensor data that indicates a presence of a stationary entity that is proximate to the vehicle 302 and/or a classification of the stationary entity as a type (e.g., building, tree, road surface, curb, sidewalk, unknown, etc.). In additional or alternative examples, the perception component 322 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planning component 324 may determine a path for the vehicle 302 to follow to traverse through an environment. For example, the planning component 324 may determine various routes and vehicle trajectories and various levels of detail. For example, the planning component 324 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 324 may generate an instruction for guiding the vehicle 302 along at least a portion of the route from the first location to the second location. In at least one example, the planning component 324 may determine how to guide the autonomous vehicle from a first waypoint in the sequence of waypoints to a second waypoint in the sequence of waypoints. In some examples, the instruction may be a vehicle trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In various examples, the planning component 324 may include a prediction component that is configured to predict one or more predicted object trajectories associated with a detected object in an environment, such as based on sensor data. The predicted object trajectories may be determined using a probabilistic heat map (e.g., discretized probability distribution) to predict object behavior. In some examples, the one or more predicted object trajectories may be based on a top-down representation of an environment of the vehicle 302. In various examples, the one or more predicted object trajectories may be determined utilizing tree search methods, temporal logic formulae, and/or machine learning techniques. In various examples, the planning component 324 may utilize the predicted object trajectories, other object data, and/or the top-down representation of the environment to control the vehicle 302.

In at least one example, the vehicle computing device(s) 304 may include one or more system controllers 326, which may be configured to control steering, propulsion, braking, safety, emitters, communication, and other systems of the vehicle 302. The system controller(s) 326 may communicate with and/or control corresponding systems of the drive system(s) 314 and/or other components of the vehicle 302.

The memory 318 may further include one or more maps 328 that may be used by the vehicle 302 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 302 may be controlled based at least in part on the map(s) 328. That is, the map(s) 328 may be used in connection with the localization component 320, the perception component 322, and/or the planning component 324 to determine a location of the vehicle 302, detect objects in an environment, generate routes, determine actions and/or trajectories to navigate within an environment.

In some examples, the one or more maps 328 may be stored on a remote computing device(s) (such as the computing device(s) 334) accessible via one or more networks 338. In some examples, multiple maps 328 may be stored based on, for example, a characteristic (e.g., type of entity, time of day, day of week, season of the year, etc.). Storing multiple maps 328 may have similar memory requirements, but increase the speed at which data in a map may be accessed.

In various examples, the simulation component 330 may include functionality to generate one or more simulations to assist in vehicle control planning considerations. In some examples, the simulation(s) generated by the simulation component 330 may include those utilized to determine one or more actions to take, such as with respect to one or more detected objects. The control planning considerations may include actions in response to object interactions (e.g., yielding, merging, etc.), actions at junctions (e.g., traffic light junctions, non-traffic light junctions, etc.), and the like.

As can be understood, the components discussed herein (e.g., the localization component 320, the perception component 322, the planning component 324, the one or more system controllers 326, the one or more maps 328, and the simulation component 330 are described as divided for illustrative purposes. However, the operations performed by the various components may be combined or performed in any other component. In various examples, as described herein the controller may include one or more of the localization component 320, the perception component 322, the planning component 324, the one or more system controllers 326, the one or more maps 328, and the simulation component 330, such as to process data associated with each component and control the vehicle based in part on the data.

In some instances, aspects of some or all of the components discussed herein may include any models, techniques, and/or machine learning techniques. For example, in some instances, the components in the memory 318 (and the memory 332, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In the illustrative example, the computing device(s) 334 may include a simulation component 336, such as simulation system 106. The simulation components 336 may be configured to generate simulations for evaluating a performance of an object controller 340. For the purposes of this discussion, the object controller 340 may include a controller configured to perform the functions and operations of a simulated object representative of an object detected in a physical environment (e.g., object 104, object 208), such as based sensor data captured by the sensor systems 306 and processed by the perception component 322. In other words, the object controller 340 may be configured to control a simulated object to operate in a human-like manner.

The simulation component 336 may include a simulation generation component 342 configured to generate one or more simulations for evaluating the object controller 340, such as simulation 100 and simulation 218. In some examples, the simulations) may be generated based on an update to hardware and/or software of the object controller 340. In some examples, the simulation component 336 may be configured to determine an update to the object controller 340. Based on determining the update, the simulation component 336 may cause the evaluation to be initiated, such as by instructing the simulation generation component 342 to generate the simulation(s).

In some examples, the simulation component 336 may generate the simulation(s) responsive to receiving an instruction or a request to validate (e.g., evaluate) the object controller 340. In various examples, the request may be received based on a user input via an interface 344 and/or via a message sent via the network(s) 338 from another computing device, such as after performing an update or change to the object controller 340. In some examples, the request may be received based on an instruction to periodically evaluate an object controller 340.

The simulation generation component 342 may generate the simulation(s) utilizing the techniques described above and described in the U.S. Patent Applications incorporated by reference above. In some examples, the simulation(s) may include a playback vehicle and at least one simulated vehicle that is configured to be controlled by the object controller 340. Additionally, the simulation(s) may include one or more playback objects that operate based on log data (e.g., data captured by the vehicle computing device(s) 304 during operation of the vehicle 302). In some examples the simulated objects may be included in the simulation based on proximity to the vehicle 302. As discussed above, a number of smart objects and playback objects included in the simulation may be determined based on the object controller 340 and/or portion thereof to be evaluated.

In various examples, the simulation generation component 342 may generate the simulation(s) based on input received via the interface 344 and/or from a remote computing device (e.g., via the request and/or instruction). In some examples, the input may include an identifier associated with the object controller 340 to be evaluated, an identifier associated with a log to use in the evaluation, a set of scenarios to utilize for the simulation(s), a location associated with a storage of the set of scenarios, a number of scenarios to be included in the simulation, a percentage of a pre-determined set of scenarios to be included in the simulation, a time duration (e.g., time limitation) of the simulation, and/or a particular pre-determined set of scenarios and/or type thereof to be included in the simulation.

In some examples, the input may include an input to evaluate a performance of the object controller 340 with respect to a particular object type. In such examples, the simulation generation component 342 may generate the simulation(s) with smart objects of the particular object type.

In various examples, an evaluation component 346 may be configured to run the simulation with the object controller 340 controlling a simulated object and to determine metrics corresponding to performance attributes of the object controller. The metrics may represent one or more differences between a movement of the simulated object in a simulated environment and movement of an associated object operating in a physical environment. In various examples, the evaluation component 346 may be configured to determine whether the difference(s) associated with the metrics meet or exceed a threshold value, such as described above. In various examples, the evaluation component 346 may be configured to present data associated with the evaluation, such as an indication of validation, an indication of invalidation, and/or evaluation results (e.g., performance metrics associated with the simulation(s)). In various examples, the evaluation component 346 may be configured to provide the data to a user, such as via the interface(s) 344 (and/or display(s) 348) and/or by causing the data to be presented via a display of a remote computing device.

In various examples, the simulation component 336 may include a recommendation component 350 configured to identify an error associated with an evaluation of the object controller 340 and generate a recommendation to mitigate the error. In some examples, the recommendation component may determine the error based on a determination that a performance metric associated with one or more simulations does not satisfy a threshold value (e.g., meets or exceeds the threshold value). In some examples, the recommendation component may be configured to determine data associated with the error, such as an object type component associated with the error (e.g., error associated with controlling a particular type of object), a particular time associated with the error, a simulation associated with the error and/or other data. In some examples, the recommendation component 350 may process the data and may determine one or more actions to perform to mitigate the error. In some examples, the recommendation component 350 may utilize machine learning techniques, heuristics, and/or other methods for identifying the action(s). In some examples, the recommendation may include the actions. The recommendation component 350 may be configured to cause the recommendation to be presented to the user, such as via the interface(s) 344 and/or by causing the recommendation to be presented on the display of the remote computing device.

In various examples, the computing device(s) 334 may include one or more input/output (I/O) devices, such as via one or more interfaces 344 of the computing device(s) 334. The interface(s) 344 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In some examples, a user may view the user interfaces associated with the simulation component 336, such as to input data and/or view results via one or more displays 348. Depending on the type of computing device, such as a user computing device, server computing device, or the like, the display 348 may employ any suitable display technology. For example, the display 348 may be a liquid crystal display, a plasma display, a light emitting diode display, an OLED (organic light-emitting diode) display, an electronic paper display, or any other suitable type of display able to present digital content thereon. In some examples, the display 348 may have a touch sensor associated with the display 348 to provide a touchscreen display configured to receive touch inputs for enabling interaction with a graphical user interface presented on the display 348. Accordingly, examples herein are not limited to any particular display technology.

The vehicle 302 may also include one or more emitters 308 for emitting light and/or sound. The emitters 308 may include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 may also include one or more communication connections 310 that enable communication between the vehicle 302 and one or more other local or remote computing device(s). For instance, the communication connection(s) 310 may facilitate communication with other local computing device(s) on the vehicle 302 and/or the drive system(s) 314. Also, the communication connection(s) 310 may allow the vehicle to communicate with other nearby computing device(s) (e.g., computing device(s) 334, other nearby vehicles, etc.).

The communications connection(s) 310 may include physical and/or logical interfaces for connecting the vehicle computing device(s) 304 to another computing device or a network, such as network(s) 338. For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s) 334.

In at least one example, the vehicle 302 may include one or more drive systems 314. In some examples, the vehicle 302 may have a single drive system 314. In at least one example, if the vehicle 302 has multiple drive systems 314, individual drive systems 314 may be positioned on opposite ends of the vehicle 302 (e.g., the front and the rear, etc.). In at least one example, the drive system(s) 314 may include one or more sensor systems to detect conditions of the drive system(s) 314 and/or the surroundings of the vehicle 302. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 314. In some cases, the sensor system(s) on the drive system(s) 314 may overlap or supplement corresponding systems of the vehicle 302 (e.g., sensor system(s) 306).

The drive system(s) 314 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 may include a drive module controller which may receive and preprocess data from the sensor system(s) and to control operation of the various vehicle systems. In some examples, the drive module controller may include one or more processors and memory communicatively coupled with the one or more processors. The memory may store one or more systems to perform various functionalities of the drive system(s) 314. Furthermore, the drive system(s) 314 may also include one or more communication connection(s) that enable communication by the respective drive module with one or more other local or remote computing device(s).

In at least one example, the direct connection 312 may provide a physical interface to couple the one or more drive system(s) 314 with the body of the vehicle 302. For example, the direct connection 312 may allow the transfer of energy, fluids, air, data, etc. between the drive system(s) 314 and the vehicle. In some instances, the direct connection 312 may further releasably secure the drive system(s) 314 to the body of the vehicle 302.

In at least one example, the localization component 320, the perception component 322, the planning component 324, the one or more system controllers 326, the one or more maps 328, and the simulation component 330, may process data (e.g., sensor data, simulation data), as described above, and may send their respective outputs, over the one or more network(s) 338, to the computing device(s) 334. In at least one example, the localization component 320, the perception component 322, the planning component 324, the one or more system controllers 326, the one or more maps 328, and the simulation component 330, may send their respective outputs to the computing device(s) 334 at a particular frequency, after a lapse of a predetermined period of time, in near real-time, etc.

In some examples, the vehicle 302 may send sensor data to the computing device(s) 334 via the network(s) 338. In some examples, the vehicle 302 may receive sensor data from the computing device(s) 334 and/or one or more remote sensor systems via the network(s) 338. The sensor data may include raw sensor data and/or processed sensor data and/or representations of sensor data. In some examples, the sensor data (raw or processed) may be sent and/or received as one or more log files.

The computing device(s) 334 may include one or more processors 352 and a memory 332 storing the simulation component 336. The processor(s) 316 of the vehicle 302 and the processor(s) 352 of the computing device(s) 334 may be any suitable processor capable of executing instructions to process data and perform operations as described herein. By way of example and not limitation, the processor(s) 316 and 352 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 318 and 332 are examples of non-transitory computer-readable media. The memory 318 and 332 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 318 and 332 may include at least a working memory and a storage memory. For example, the working memory may be a high-speed memory of limited capacity (e.g., cache memory) that is used for storing data to be operated on by the processor(s) 316 and 352. In some instances, the memory 318 and 332 may include a storage memory that may be a lower-speed memory of relatively large capacity that is used for long-term storage of data. In some cases, the processor(s) 316 and 352 cannot operate directly on data that is stored in the storage memory, and data may need to be loaded into a working memory for performing operations based on the data, as discussed herein.

It should be noted that while FIG. 3 is illustrated as a distributed system, in alternative examples, components of the vehicle 302 may be associated with the computing device(s) 334 and/or components of the computing device(s) 334 may be associated with the vehicle 302. That is, the vehicle 302 may perform one or more of the functions associated with the computing device(s) 334, and vice versa.

FIGS. 4-8 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 4:
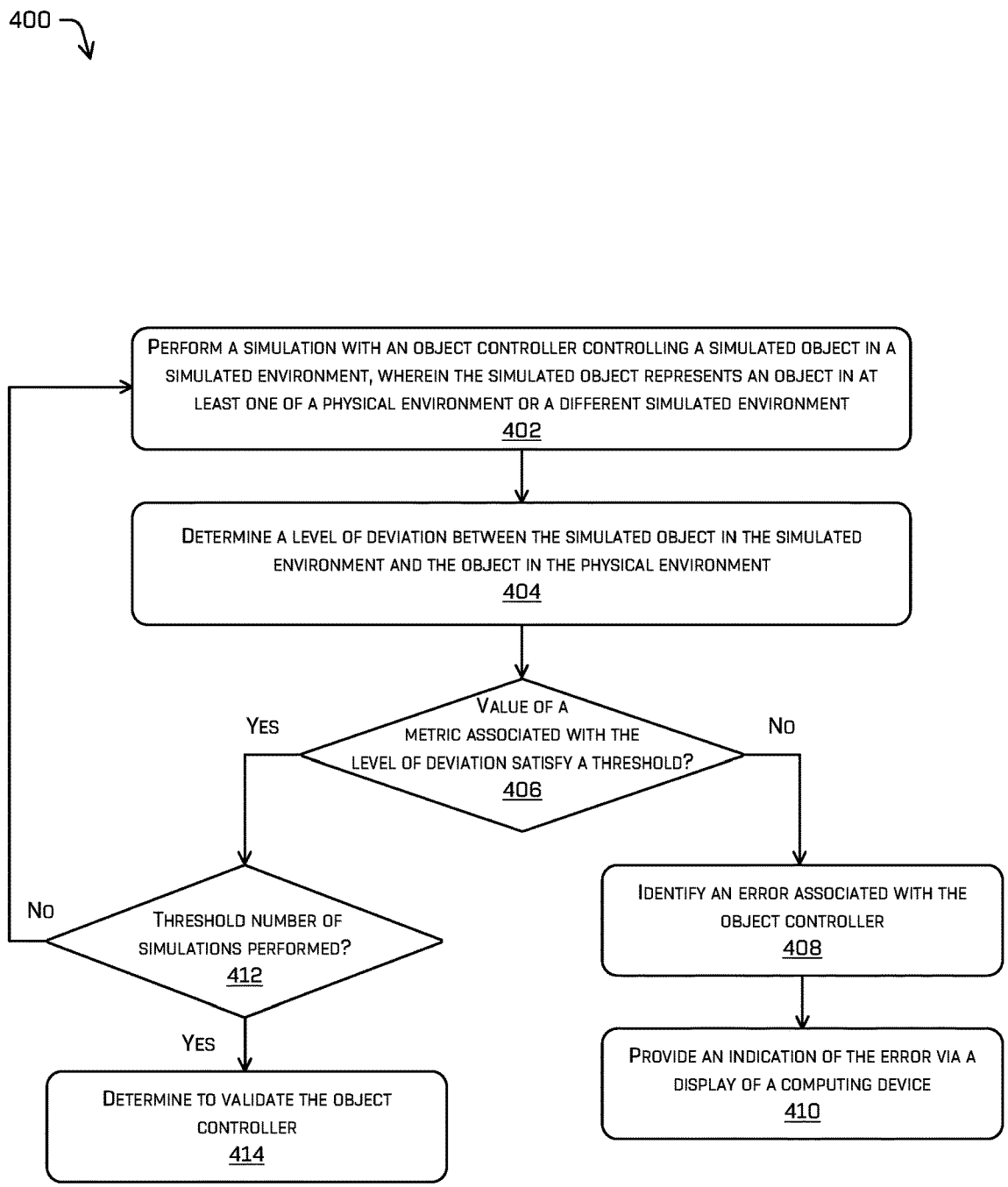
FIG. 4 depicts an example process for validating an object controller based at least in part on a performance of the object controller controlling a simulated object in a simulation, in accordance with examples of this disclosure.

FIG. 4 depicts an example process 400 for validating an object controller based at least in part on a performance of the object controller controlling a simulated object in a simulation, in accordance with examples of this disclosure. Some or all of the process 400 may be performed by the simulation system 106 of FIG. 1 and/or by the computing device(s) 334 of FIG. 3.

At operation 402, the process 400 includes performing a simulation with an object controller controlling a simulated object in a simulated environment, wherein the simulated object represents an object in at least one of a physical environment or a different simulated environment. The simulation can be generated to test a performance of the object controller in controlling the simulated object. In some examples, the simulation may be generated based at least in part on data associated with a vehicle operating in the physical environment proximate an object. In such examples, the simulated object may represent the actual object associated with the physical environment (e.g., human operated object). The data may include sensor data captured by one or more sensors on the vehicle and/or one or more remote sensors (e.g., on another vehicle, mounted in the environment, etc.), map data (e.g., one or more road segments associated with the environment and/or a vehicle path there-through), determined actions by which a controller (e.g., local or remote operator, active autonomous controller, etc.) controlled the vehicle through the environment, times associated with the actions, object data associated with one or more objects (e.g., object locations, trajectories (e.g., direction of travel, speed, acceleration, jerk, etc.), orientation (e.g., yaw, yaw rate, etc.), position, and the like. In some examples, the simulation may be generated based at least in part on simulated data associated with a different simulation. In such examples, the data may include stored data associated with an operation of a previous version of the object controller and/or another object controller controlling at least one simulated object in a different simulated environment.

In various examples, the simulation system may generate and/or perform the simulation responsive to receiving a request and/or instruction to evaluate a performance of the object controller. In some examples, the request and/or instruction may be received based on a periodic evaluation schedule associated with the object controller. In some examples, the request and/or instruction may be received from a user responsive to identifying or suspecting a degraded performance of the object controller. In some examples, the request and/or instruction may be received based on an update to the object controller. In some examples, the simulation system may be configured to determine updates to hardware and/or software of the object controller. Based on the updates, the simulation system may initiate the evaluation (e.g., generation of the simulation). In some examples, the simulation system may receive an indication of the update, such as from a remote computing device or via a user interface of the computing device. In such examples, the simulation system may initiate the evaluation.

The simulation may include a playback vehicle (e.g., simulated vehicle operating based on the log data) and one or more simulated objects representative of objects detected in at least one of the physical environment or a different simulated environment. In some examples, the simulation system may determine the simulated object(s) to include in the simulation based on a proximity to the vehicle. In such examples, based on a determination that the associated objects operated within a threshold distance of the vehicle, the simulation system may include corresponding simulated objects in the simulation. At least one of the simulated object(s) may include a smart object that is configured to be controlled by the object controller. In some examples, the simulation may additionally include one or more playback objects (e.g., simulated object operating based on the log data). In some examples, the simulation system may determine a number of smart objects to include in the simulation based on an object controller and/or portion thereof to be evaluated.

In various examples, the simulation system may determine the at least one of the simulated object(s) for the object controller to control based on a determination that the simulated object(s) is within a second threshold distance of the vehicle, the second threshold distance being less than a first threshold distance associated with simulated object inclusion in the simulation. For example, the simulation system may determine that a scenario or scene in which the object controller is being evaluated includes a first object and a second object, both operating within a first threshold distance of (e.g., in proximity to) the vehicle. Based on a determination that the first object and the second object are within the first threshold distance, the simulation system may determine to include the first object and the second object in the simulation. The simulation system may then determine that the first object is within the second threshold distance of the vehicle and that the second object is not within the second threshold distance. Based on the determination that the first object is within the second threshold distance of the vehicle and the second object is not within the second threshold distance, the simulation system may cause the object controller to control the first object (e.g., first object as a smart object) and include the second object in the simulation as a playback object.

In some examples, the number and/or object type of smart objects included in the simulation may be determined based on the request and/or the instruction to evaluate the object controller. In some examples, the request may include a specific object type component, such as object type component 110 to evaluate. In such examples, the simulation system may generate the simulations with smart objects associated with a particular object type corresponding to the object type component. In some examples, the request and/or instruction may include update data associated with the update to the object controller. In such examples, the simulation system may generate the simulation based on the update data. For example, the update data may indicate an update to an object type controller associated with the object controller. In such examples, the simulation system may generate the simulation based on a particular object type associated with the object type controller.

In various examples, the simulation system may generate the simulation based at least in part on one or more scenarios, such as to evaluate the performance of the object controller controlling the simulated object through the scenario. In some examples, an update to the object controller may include a modification to a control functionality of the object controller in a particular scenario. In such examples, the simulation computing system may generate the simulation based on the scenario. In various examples, the simulation system may select one or more logs and/or portions thereof that include the scenario with which to generate one or more simulations.

The simulation system may perform or run the simulation for the period of time associated with the simulation. The simulation system may control the object according to one or more parameters, such as those described above. The parameter(s) may include default parameters, parameters based on an object type, parameters associated with an observed object behavior of the object, and the like.

The simulation system may be configured to determine one or more locations, trajectories, speeds, accelerations, jerks, yaws, and the like associated with simulated object. In various examples, the simulation system determines the locations, trajectories, speeds, accelerations, jerks, yaws, and the like at a periodic time interval (e.g., 0.05 seconds, 0.1 second, 0.2 seconds, etc.) throughout the simulation.

At operation 404, the process 400 includes determining a level of deviation between the simulated object in the simulated environment and the object in the physical environment. In various examples, the level of deviation may include differences between locations, trajectories, speeds, accelerations, jerks, yaws, yaw rates, and the like at respective times during the simulation. In some examples, the level of deviation may include an average deviation over a period of time (e.g., an average of deviations associated with one or more time intervals). In some examples, the level of deviation may include a maximum deviation associated with the period of time. In various examples, the level of deviation may be represented by values of performance metrics (e.g., metrics) associated with the performance of the object controller controlling the simulated object in the simulation, as described herein.

In various examples, the simulation may include two or more simulated objects of two or more different types. In some examples, the simulation system may be configured to determine an average and/or maximum level of deviation (e.g., value of the metric) associated with the object controller controlling each type of object in the simulation. In various examples, the simulation system may additionally be configured to determine an overall level of deviation (e.g., value of the metric) associated with the simulation, the overall value being associated with an overall performance of the object controller controlling the simulated object and one or more other objects. In various examples, the simulation system may evaluate the performance of the object controller throughout a plurality of simulations. In some examples, the simulation system may be configured to determine an overall level of deviation associated with a performance of the object controller in the plurality of simulations and/or an overall level of deviation associated with the object controller controlling simulated objects of different object types in the plurality of simulations.

In various examples, the overall level of deviation (e.g., performance metric) may be determined based on weighted metrics associated with different smart objects in a simulation. In such examples, the simulation system may be configured to evaluate the overall performance of the object controller based on different weighting factors. Non-limiting examples of the weighting factors include distance to the vehicle, time an object is present in a simulation, and the like. In some examples, the weighting factors be based on one or more threshold times and/or distances. For example, a first weighting factor (e.g., 1.0) may be associated with a first threshold time or distance, a second weighting factor (e.g., 1.1) may be associated with a second threshold time or distance, a third weighting factor (e.g., 1.2) may be associated with a third threshold time or distance, and so on.

At operation 406, the process 400 includes determining whether a value of a metric associated with the level of deviation satisfies a threshold (e.g., is less than or equal to a maximum threshold value, equal to or greater than a maximum threshold value). In some examples, the threshold may be associated with a particular time interval, an object type, a simulation, and/or a plurality of simulations. The threshold may be determined based on the object controller and/or portion thereof to be evaluated. In some examples, the threshold may be determined based on an object type associated with the object corresponding to the metric. In at least one example, the threshold may include a threshold distance between an actual object location and a simulated object location.

Based on a determination that the value of the metric does not satisfy the threshold ("No" at operation 406), the process 400, at operation 408 includes identifying an error associated with the object controller. In other words, the simulation system determines the error based on a determination that a level of deviation exceeds a threshold. In some examples, the simulation system may be configured to determine a portion of the object controller associated with the error. In some examples, the simulation system may be configured to determine an object type associated with the error. For example, the simulation system may determine the error based on a determination that a difference in velocities associated with an actual object and a corresponding simulated object at one or more times of the simulation exceeds a threshold velocity difference (e.g., in direction of travel and/or speed) for a particular object type associated with the object.

At operation 410, the simulation system may provide an indication of the error via a display of a computing device. In some examples, the computing device may be associated with the request and/or instruction to evaluate the object controller. In such examples, the simulation system may be configured to send the indication of the error to the requesting computing device, such as via electronic mail, an application, a pop-up notification on a user interface, or the like. In various examples, the indication of the error may include an indication of invalidity, evaluation results, metrics, detected differences in movement between the simulated object and the object, and/or other information about the simulation and/or other simulations of the plurality of simulations.

Based on a determination that the value of the metric satisfies the threshold ("Yes" at operation 406), the process 400, at operation 412 includes determining whether the threshold number of simulations have been performed. In other words, the simulation system determines whether a number of simulations have been performed based on a determination that a level of deviation satisfies a threshold. In some examples, the threshold number of simulations may be determined based on the log associated with the data. In such examples, the threshold number may be determined based on a length of time of the log and/or a period of time associated with each simulation (e.g., 20 seconds, 30 seconds, 60 seconds, 2 minutes, etc.). In some examples, the threshold number may be determined based on lengths of time associated with two or more logs used in the evaluation of the object controller.

In some examples, the threshold number may include a pre-determined number of simulations (e.g., 55, 85, 120, etc.) used in the evaluation of a particular object controller. In some examples, the threshold number may be determined based on the particular object controller and/or portion thereof to be evaluated. In such examples, the simulation system may determine threshold number based on the particular object controller and/or the portion thereof to be evaluated. For example, the evaluation may include an evaluation of the performance of the object controller to control a particular type of object. The threshold number of simulations may be determined based on the particular type of object. In some examples, the threshold number may be determined based on a scenario associated with the evaluation. In such examples, the simulation system may determine the scenario to be evaluated and may determine the number of simulations associated therewith.

Based on a determination that the threshold number of simulations have not yet been performed ("No" at operation 412), the simulation system may perform a second simulation for evaluating the object controller, such as that described above at operation 402. Based on a determination that the threshold number of simulations have been performed ("Yes" at operation 412), the simulation system, at operation 414 may determine to validate the object controller. In various examples, based on a determination that the object control is valid, the simulation system may cause the object controller to control one or more smart objects in additional simulations generated to evaluate a performance of a vehicle controller (e.g., autonomous vehicle controller).

In various examples, based on a determination that the object controller is valid, the simulation system may provide an indication of validation via the display of the computing device. In some examples, the simulation system may cause the indication of validation to be presented via a user interface of the simulation system. As discussed above, simulation system may cause the indication of validation to be presented on the display of the computing device associated with the request to evaluate the performance of the object controller. In various examples, the indication of validation may include evaluation results, metrics, detected differences in movement between the simulated object and the object, and/or other information about one or more of a plurality of simulations.

Figure 5:
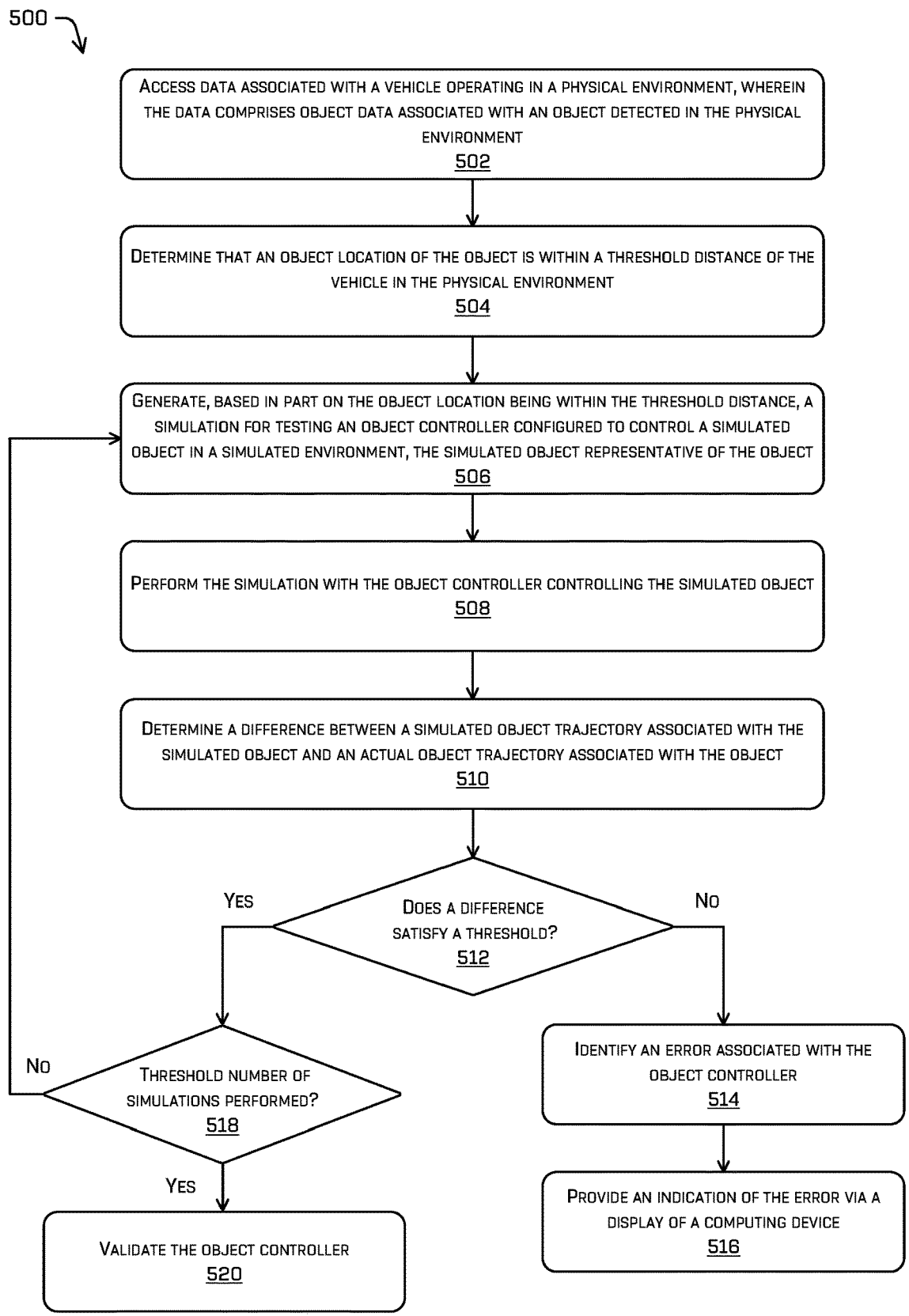
FIG. 5 depicts an example process for validating an object controller based at least in part on a simulated trajectory of a simulated object generated by the object controller, in accordance with examples of this disclosure.

FIG. 5 depicts an example process 500 for validating an object controller based at least in part on a predicted trajectory of a simulated object generated by the object controller, in accordance with examples of this disclosure. Some or all of the process 500 may be performed by the simulation system 106 of FIG. 1 and/or by the computing device(s) 334 of FIG. 3.

At operation 502, the process 500 includes accessing data associated with a vehicle operating in a physical environment, wherein the data comprises object data associated with an object detected in the physical environment. In various examples, the simulation system may access the data based on an instruction or request to evaluate an object controller. In some examples, the simulation system may be configured to periodically (e.g., every 24 hours, every week, etc.) evaluate the performance of the object controller. In such examples, the instruction may be received based on a periodic evaluation cycle. In some examples, the simulation system may receive a request to evaluate the object controller, such as from a remote computing device or via a user interface associated with the simulation system. In various examples, the request may be sent to or input into the simulation system based on a software and/or hardware update to a component associated with the object controller. In response to receiving the request (or instruction), the simulation system may access the data.

The data may include log data associated with the vehicle traversing the physical environment. The log data may include data observed and/or perceived by the vehicle, such as data identifying characteristics of the physical environment, the object (and/or other objects) detected in proximity to the vehicle, attributes of characteristics of the physical environment, the object and/or other objects (e.g., classifications, sizes, shapes, positions, locations, trajectories, velocities, accelerations, jerks, etc.).

In some examples, the log data may include object data including data associated with operations and/or behaviors of the object and/or the other objects. In some examples, the log data may include event data associated with events observed by the vehicle, such as accidents or near accidents, traffic violations, crossing or jaywalking pedestrians, cyclists, or animals, weather anomalies, construction zones, detours, school zones, and the like. The events and/or object behaviors may be designated from a list of events and/or object behaviors that are useful for driving simulations. In some examples, the event data and/or object data including the operations and/or behaviors of the object may be used to determine a level of aggressive behavior data (e.g., in a spectrum of conservative to aggressive behaviors), a level of law abiding behavior (e.g., coming to a complete stop at a stop sign, rolling through stop signs, operating within speed limits, etc.), and/or other behaviors associated with the object (e.g., human operating in the physical environment).

In some examples, the data (e.g., object data associated therewith) may include an object type of the object. The object type may include an object class (e.g., four-wheeled object (e.g., car, truck, etc.), two-wheeled object (e.g., bicycle, etc.), pedestrian, etc.) and/or an object sub-class (e.g., sedan, bus, petty cab, streetcar, electric bicycle, articulated vehicle, train, etc.). In the illustrative example, the data may include an indication that the object type of the object is a two-wheeled bicycle, though this is merely an example, and other classes and sub-classes of objects are contemplated herein.

In various examples, the data may include an object trajectory associated with the object. The object trajectory may include a direction of travel, a speed, an acceleration, a jerk, or the like of the object at a particular time during the log. In some examples, the data may include a plurality of object trajectories associated with a plurality of times of the log. In at least one example, the plurality of times may include times at a periodic interval. In various examples, the data may include locations, positions, and/or orientations of the object associated with an operation of the object in the physical environment.

At operation 504, the process 500 includes determining that an object location of the object is within a threshold distance of the vehicle in the physical environment. The threshold distance may include a distance associated with object relevance to the vehicle. The object relevance may represent a relationship or potential relationship between the vehicle and the object, such that an action of one could potentially result in a reaction by the other. In other words, the proximity between the vehicle and the object could potentially result in an interaction between the vehicle and the object (e.g., unplanned movements (e.g., yielding motion, lane change, etc.) in reaction to one another).

At operation 506, the process 500 includes generating, based at least in part on the object location being within the threshold distance, a simulation for testing an object controller configured to control a simulated object in a simulated environment, the simulated object representative of the object. In various examples, the simulation system may generate the simulation based at least in part on the request or instruction to evaluate the object controller described above. The simulation system may generate the simulation based on the data, such as utilizing the techniques described in the U.S. Patent Applications incorporated herein by reference above.

In various examples, the simulation may be associated with a vehicle log (e.g., vehicle trip (e.g., cycle from start to stop), portion of vehicle trip, etc.) corresponding to the data. The simulation may represent the log or a portion thereof. In some examples, the portion of the log may represent a period of time (e.g., 25 seconds, 30 seconds, 40 seconds, etc.) that is less than a total time associated with the log. For example, a simulation may include a 20 second period of time (e.g., snippet) of a 13-minute log associated with a vehicle operating in the physical environment. Though this is just an example and other periods of time associated with the simulation and/or log are contemplated herein.

In various examples, the log and/or the portion thereof associated with the simulation may be determined based on a particular scenario (e.g., object interactions with the vehicle, object interactions with other objects, object actions, environmental data (e.g., curving roads, hills, etc.), etc.) in which the object controller is to be evaluated. As discussed above, the request and/or instruction may include a request to evaluate the performance of the object controller controlling the simulated object in the particular scenario. Based on the request, the simulation system may identify the log and/or the portion thereof as including the particular scenario to be used in the generation of the simulation. Additionally or in the alternative, the log and/or the portion thereof may be determined based on the objects located therein. In some examples, the request and/or instruction may include a request to evaluate the performance of the object controller controlling a particular object type. In such examples, the simulation system may be configured to identify the log and/or portion thereof that includes the particular type of object to be used in the generation of the simulation.

The simulation may include the vehicle operating in play back, such as that based on the data (e.g., actual movement in the physical environment) and a simulated object (e.g., smart object) that represents the object and is configured to be controlled by the object controller. In some examples, the simulation may additionally include one or more playback objects, such as playback object 104(3) of FIG. 1. The playback object(s) may be simulated object(s) that operate in the simulated environment based on the data. In some examples, the simulation system may determine a number of smart objects to include in the simulation based on the object controller and/or portion thereof to be evaluated. At least one of the detected objects in the physical environment may be a smart object that is configured to be controlled by the object controller.

At operation 508, the process 500 includes performing the simulation with the object controller controlling the simulated object. In various examples, the simulation system may cause the object controller to control the simulated object that represents the object through the simulated environment. In various examples, the object controller may control the simulated object from a first simulated object location (e.g., at an initial time) through the simulated environment based on the object type of the object (e.g., class and/or sub-class).

In various examples, the object controller may be configured to control the simulated object based on one or more parameters. In some examples, the object controller may determine the parameters based in part on the object type. The parameter(s) may include a velocity profile (e.g., lateral and/or longitudinal), an acceleration profile (e.g., lateral and/or longitudinal), a yaw profile (e.g., yaw angle, yaw rate, etc.), and/or other movement profiles (e.g., delay time at a stop sign, yielding behaviors, etc.). In some examples, the object controller may determine the parameter(s) utilizing techniques, such as those described in U.S. patent application Ser. Nos. 16/555,988 and 17/184,128, incorporated herein by reference above for all purposes. In some examples, the object controller may determine the parameter (s) based on observed operating behaviors associated with the object operating in the physical environment. In some examples, the operating behaviors (e.g., the level of aggressive behavior, the level of law-abiding behavior, and/or other behaviors associated with the object) may be included in the data, such as in the object data of the log data. In some examples, the object controller may be configured to process the data to determine the operating behaviors associated with the object. Accordingly, in some examples, the object controller may be configured to control the simulated object based on observed behaviors. In such examples, the object controller may cause the simulated object to move in a manner that most closely emulates the actual (human-operated) object.

In various examples, the object controller may be configured to control the simulated object according to default parameters. The default parameters may include parameter (s) associated with average object behaviors (e.g., average speed, average accelerations, average amount of jerk, average yaw, average yaw rate, etc.). In various examples, the default parameters may be applied based on a determination that a level of observed behavior of an object (e.g., based on log data) is equal to or less than a threshold level.

At operation 510, the process 500 includes determining a difference between a simulated object trajectory associated with the simulated object and an actual object trajectory associated with the object. The difference between the trajectories may include a difference in one or more values associated therewith (e.g., difference in speeds, difference in accelerations, difference in yaw, difference in yaw rate, difference in direction of travel). The difference between trajectories may represent a performance metric (e.g., metric) associated with the performance of the object controller. In various examples, the simulation system may determine the simulated object trajectory at periodic time intervals (e.g., every 0.1 second, 0.2 seconds, 1 second, etc.) throughout the simulation.

In various examples, the simulated object trajectory may include a direction of travel, speed, acceleration, and/or jerk associated with a movement of the simulated object. In some examples, the simulated object trajectory may additionally have associated therewith position and/or orientation information, such as a yaw and/or yaw rate of the simulated object. In various examples, the simulated object trajectory may represent the movement of the simulated object through the simulated environment. As such, a difference between the simulated object trajectory and the actual object trajectory may represent a difference in movement between the simulated object and the actual object (e.g., how the actual object moved through the physical environment).

At operation 512, the process 500 includes determining whether the difference satisfies a threshold. In various examples, the threshold may be determined based on the object type of the object. For example, the simulation system may determine the threshold based on a determination that the object is a pedestrian. The threshold may include a threshold associated with a particular time interval, two or more intervals of the simulation, and/or a plurality of simulations. For example, the simulation system may be configured to determine whether a difference between the simulated object trajectory and the actual object trajectory is greater than a threshold value at a particular time. For another example, the simulation system may determine whether an average and/or maximum value of a plurality of differences (e.g., metrics) associated with the trajectories meets or exceeds a threshold value.

Based at least in part on a determination that the difference does not satisfy the threshold ("No" at operation 512), the process 500, at operation 514 includes identifying an error associated with the object controller. In some examples, the simulation system may be configured to determine a portion of the object controller associated with the error. For example, the simulation system may determine that the error is associated with a component corresponding to determining an acceleration of the simulated object. For another example, the simulation system may determine that the error is associated with a component corresponding to determining a speed of the simulated object. In some examples, the simulation system may be configured to determine an object type associated with the error (e.g., error with an object type component). For example, the simulation system may determine the error based on a determination that a difference in velocities of the simulated object and the object that is a car at one or more times of the simulation exceeds a threshold velocity difference (e.g., in direction of travel and/or speed) for a car.

At operation 516, the process 500 includes providing an indication of the error via a display of a computing device. In some examples, the computing device may be associated with the request. In such examples, the simulation system may be configured to send the indication of the error to the requesting computing device, such as via electronic mail, an application, a pop-up notification on a user interface, or the like. The indication of the error may include evaluation results, associated metrics, detected differences in trajectories and/or locations between the simulated object and the object, and/or other information about the simulation, results, or the like.

Based at least in part on a determination that the difference satisfies the threshold ("Yes" at operation 512), the process 500, includes determining whether a threshold number of simulations have been performed. In some examples, the threshold number of simulations may include a number of simulations associated with the log. In such examples, the threshold number may be determined based on a length of time of the log and/or a period of time associated with each simulation (e.g., 20 seconds, 30 seconds, 60 seconds, 2 minutes, etc.). In some examples, the threshold number may be determined based on lengths of time associated with two or more logs used in the evaluation of the object controller.

In some examples, the threshold number may include a pre-determined number of simulations (e.g., 55, 85, 120, etc.) used in the evaluation of an object controller. In some examples, the threshold number may be determined based on the object controller and/or portion thereof to be evaluated. In such examples, the simulation system may determine threshold number based on the particular object controller and/or the portion thereof to be evaluated. For example, the evaluation may include an evaluation of the performance of the object controller to control a particular type of object. The threshold number of simulations may be determined based on the particular type of object. In some examples, the threshold number may be determined based on a scenario associated with the evaluation. In such examples, the simulation system may determine the scenario to be evaluated and may determine the number of simulations associated therewith.

Based on a determination that the threshold number of simulations have not yet been performed ("No" at operation 518), the simulation system may generate a second simulation for evaluating the object controller, such as that described above at operation 506. Based on a determination that the threshold number of simulations have been performed ("Yes" at operation 518), the simulation system, at operation 520 may validate the object controller. In various examples, based on a determination that the object control is valid, the simulation system may cause the object controller to control one or more smart objects in additional simulations generated to evaluate a performance of a vehicle controller (e.g., autonomous vehicle controller). As discussed above, in some examples, the simulation system may cause an indication of validation to be presented, such as via the display of the computing device. The indication of validation may include evaluation results associated with the evaluation of the object controller.

Figure 6:
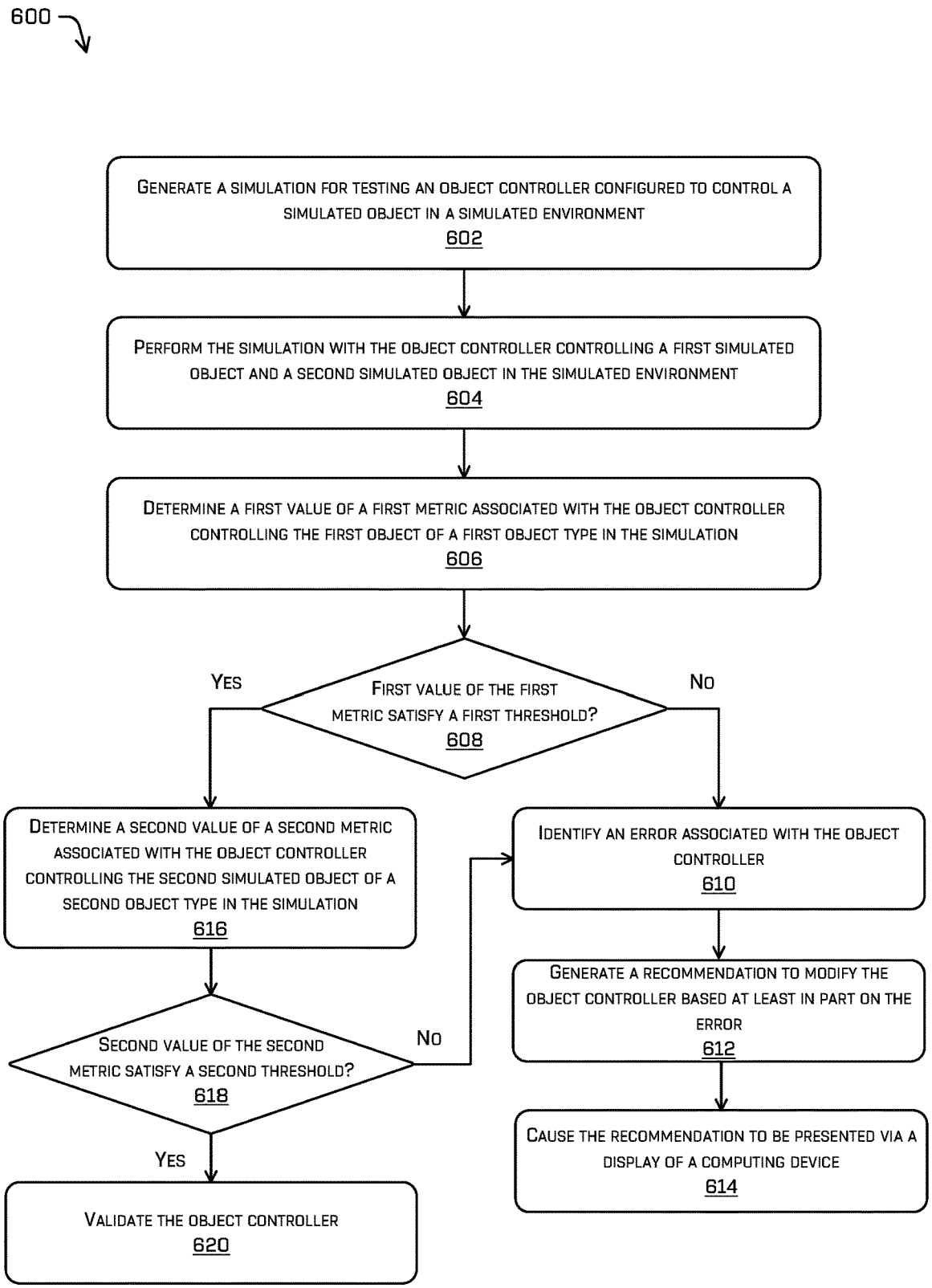
FIG. 6 depicts an example process for validating an object controller based at least in part on a performance of the object controller in controlling particular types of simulated objects in a simulation, in accordance with examples of this disclosure.

FIG. 6 depicts an example process 600 for validating an object controller based at least in part on a performance of the object controller in controlling particular types of simulated objects in a simulation, in accordance with examples of this disclosure. Some or all of the process 600 may be performed by the simulation system 106 of FIG. 1 and/or by the computing device(s) 334 of FIG. 3.

At operation 602, the process 600 includes generating a simulation for testing an object controller configured to control a simulated object in a simulated environment. In various examples, the simulation may be generated based on data (e.g., log data) associated with an operation of a vehicle. As discussed above, the simulation system may generate the simulation responsive to receiving a request and/or instruction to evaluate the performance of the object controller. In various examples, the simulation system may access the data associated with a log of a vehicle, such as that stored in a datastore associated with the simulation system. In some examples, the data may be received from a vehicle during or after the vehicle operation. For example, at the termination of a log (e.g., vehicle trip including a start of operation and a stop of the operation), a vehicle computing system may send the data to a remote computing device, such as computing device 334 of FIG. 3, for storage. The simulation system may access the data stored by the remote computing device.

The simulation may include the vehicle operating in playback, such as that based on the data (e.g., actual movement in the physical environment) and a simulated object (e.g., smart object) that represents the object and is configured to be controlled by the object controller. In some examples, the simulation may additionally include one or more playback objects, such as playback object 104(3) of FIG. 1. The play back object(s) may be simulated object(s) that operate in the simulated environment based on the data. In some examples, the simulation system may determine a number of smart objects to include in the simulation based on the object controller and/or portion thereof to be evaluated.

At operation 604, the process 600 includes performing the simulation with the object controller controlling a first simulated object and a second simulated object in the simulated environment. The simulation system may perform or run the simulation for a period of time associated with the simulation. The simulation system may be configured to determine one or more locations, trajectories, speeds, accelerations, jerks, yaws, yaw rates, and the like associated with the first simulated object and the second simulated object. In various examples, the simulation system determines the locations, trajectories, speeds, accelerations, jerks, yaws, yaw rates, and the like at a periodic time interval (e.g., 0.05 seconds, 0.1 second, 0.2 seconds, etc.) throughout the simulation. In some examples, the simulation system determines the locations, trajectories, speeds, accelerations, jerks, yaws, yaw rates, and the like associated with the first simulated object and/or the second simulated based on a determination that locations associated with the first simulated object and/or an associated first object and/or the second simulated object and/or an associated second object are within a threshold distance of a vehicle location of the vehicle. In such examples, the simulation system may determine the locations, trajectories, speeds, accelerations, jerks, yaws, yaw rates, and the like based on a determination of relevance of the first simulated object/first object and/or the second simulated object/second object to the vehicle.

At operation 606, the process 600 includes determining a first value of a metric associated with the object controller controlling the first simulated object of a first object type in the simulation. The metric may relate to locations, trajectories, speeds, accelerations, jerks, yaws, yaw rates, and the like. In some examples, the first value of the metric may include a difference between locations, trajectories, speeds, accelerations, jerks, yaws, yaw rates, and the like of the first simulated object and the first object. In some examples, the first value of the metric may be associated with one or more time intervals of the simulation. The time interval(s) may include those intervals in which at least one of the first object or the first simulated object is relevant (e.g. within the threshold distance) to the vehicle. In at least on example, the first value may include an average and/or maximum value associated differences between the locations, trajectories, speeds, accelerations, jerks, yaws, yaw rates, and the like of the first simulated object and the first object.

At operation 608, the process 600 includes determining whether the first metric satisfies a first threshold. The first threshold may be determined based at least in part on the first object type. The first threshold may be determined based on the object controller and/or portion thereof to be evaluated. In at least one example, the first threshold may include a first threshold distance between an actual object location of the first object and a simulated object location of the first simulated object. In various examples, the first threshold may be associated with a particular time interval, the simulation (e.g., portion of the log), and/or a plurality of simulations (e.g., an aggregated metric associated with two or more simulations).

Based on a determination that the first metric does not satisfy the threshold ("No" at operation 608), the process 600, at operation 610, includes identifying an error associated with the object controller. In some examples, the simulation system may be configured to determine a portion of the object controller associated with the error. The portion of the object controller may be determined based on the first object type associated with the object.

At operation 612, the process 600 includes generating a recommendation to modify the object controller based at least in part on the error. In some examples, the recommendation may include an indication of the error being associated with the object type associated with the error (e.g., first type of object). In some examples, the recommendation may include one or more actions to perform to mitigate the error. In such examples, the simulation system may be configured to determine mitigating actions based at least in part on the error. In various examples, the simulation system may utilize one or more of machine learning techniques, heuristics, and statistical analysis in the mitigating action determination.

At operation 614, the process 600 includes causing the recommendation to be presented via a display of the computing device. In some examples, the computing device may be associated with the request and/or instruction to evaluate the object controller. In some examples, the recommendation may be provided via email, text message, pop-up notification (e.g., via a native or web-based application), or the like. In various examples, the recommendation may be provided via a user interface associated with object controller validation, such as a user interface associated with initiating an evaluation of the object controller.

Based on a determination that the first metric satisfies the threshold ("Yes" at operation 608), the process 600, at operation 616, includes determining a second value of a second metric associated with the object controller controlling the second object of a second type in the simulation. The second metric may be a same metric or a different metric from the first metric. In some examples, the second value of the metric may include a difference between locations, trajectories, speeds, accelerations, jerks, yaws, yaw rates, and the like of the second simulated object and the second object. In some examples, the second value of the second metric may be associated with one or more time intervals of the simulation. The time interval(s) may include those intervals in which at least one of the second object or the second simulated object is relevant (e.g. within the threshold distance) to the vehicle. In at least on example, second first value may include an average and/or maximum value associated differences between the locations, trajectories, speeds, accelerations, jerks, yaws, yaw rates, and the like of the second simulated object and the second object.

At operation 618, the process 600 includes determining whether the second metric satisfies a second threshold. The second threshold may be the same or a different threshold from the first threshold. In various examples, the threshold may be determined based on the second object type. The second threshold may be determined based on the object controller and/or portion thereof to be evaluated. In at least one example, the second threshold may include a second threshold distance between an actual object location of the second object and a simulated object location of the second simulated object. In various examples, the second threshold may be associated with a particular time interval, the simulation (e.g., portion of the log), and/or a plurality of simulations (e.g., an aggregated metric associated with two or more simulations).

Based on a determination that the second metric does not satisfy the second threshold ("No" at operation 618), the process 600 includes identifying an error associated with the object controller, such as that described with respect to operation 610. Based on a determination that the second metric satisfies the second threshold ("Yes" at operation 618), the process 600, at operation 620, includes validating the object controller. In various examples, based on a determination that the object control is valid, the simulation system may cause the object controller to control one or more smart objects in additional simulations generated to evaluate a performance of a vehicle controller (e.g., autonomous vehicle controller). As discussed above, in some examples, the simulation system may cause an indication of validation to be presented, such as via the display of the computing device. The indication of validation may include evaluation results associated with the evaluation of the object controller.

Figure 7:
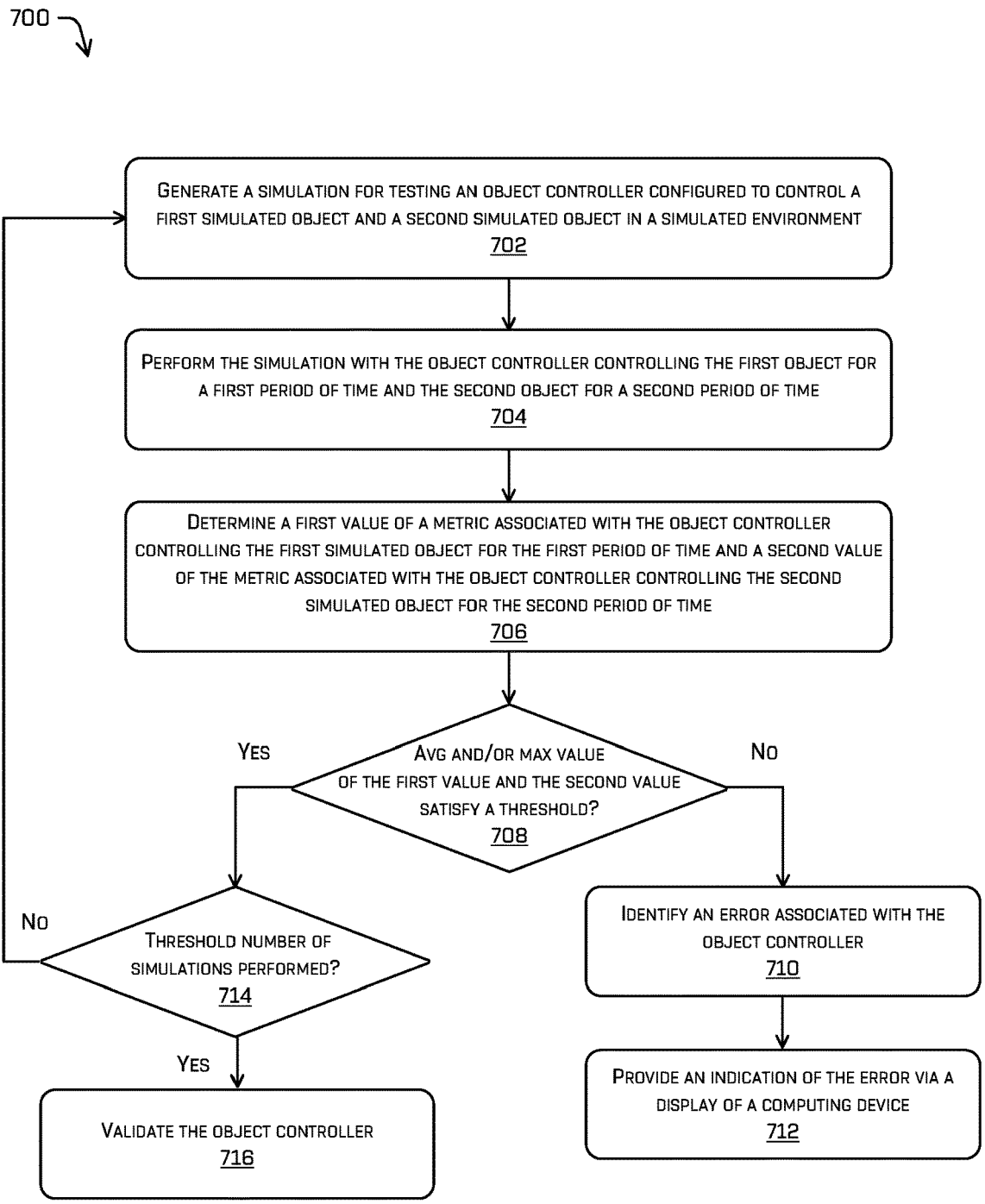
FIG. 7 depicts an example process for validating an object controller based at least in part on a performance of the object controller in controlling two or more simulated objects in a simulation, in accordance with examples of this disclosure.

FIG. 7 depicts an example process 700 for validating an object controller based at least in part on a performance of the object controller in controlling two or more simulated objects in a simulation, in accordance with examples of this disclosure. Some or all of the process 700 may be performed by the simulation system 106 of FIG. 1 and/or by the computing device(s) 334 of FIG. 3.

At operation 702, the process 700 includes generating a simulation for testing an object controller configured to control a first simulated object and a second simulated object in a simulated environment. In various examples, the simulation may be generated based on data (e.g., log data) associated with an operation of a vehicle. In such examples, the first simulated object may represent a first object detected by a vehicle computing system of the vehicle in a physical environment associated with the operation of the vehicle and the second simulated object may represent a second object detected by the vehicle computing system in the physical environment associated with the operation of the vehicle.

As discussed above, the simulation system may generate the simulation responsive to receiving a request and/or instruction to evaluate the performance of the object controller. In various examples, the simulation system may access the data associated with a log of a vehicle, such as that stored in a datastore associated with the simulation system. In some examples, the data may be received from a vehicle during or after the vehicle operation. For example, at the termination of a log (e.g., vehicle trip including a start of operation and a stop of the operation), a vehicle computing system may send the data to a remote computing device, such as computing device 334 of FIG. 3, for storage. The simulation system may access the data stored by the remote computing device.

The simulation may include the vehicle operating in playback, such as that based on the data (e.g., actual movement in the physical environment) and the first simulated object (e.g., smart object) that represents a first object and the second simulated object that represents a second object. In some examples, the simulation may additionally include one or more playback objects, such as play back object 104(3) of FIG. 1. The playback object(s) may include simulated object(s) that operate in the simulated environment based on the data. In some examples, the simulation system may determine a number of smart objects to include in the simulation based on the object controller and/or portion thereof to be evaluated.

At operation 704, the process 700 includes performing the simulation with the object controller controlling the first simulated object for a first period of time and the second simulated object for a second period of time. The simulation system may perform or run the simulation for time associated with the simulation. The first period of time may include a first portion of the time associated with the simulation and the second period of time may include a second portion of the time associated with the simulation. In some examples, the first portion of time and the second period of time may be a same period of time, may partially overlap, and/or may be different periods of time.

In various examples, the simulation system may determine the first period of time based on a first portion of the time that the first object corresponding to the first simulated object is within a first threshold distance of the vehicle. In some examples, the first threshold distance may be determined based on an object type associated with the first object. In some examples, the first threshold distance may represent a determination of relevance of the first object to the operation of the vehicle. Similarly, the simulation system may determine the second period of time based on a second portion of the time that the second object corresponding to the second simulated object is within a second threshold distance of the vehicle. The second threshold distance may be the same or a different threshold distance as the first threshold distance. In some examples, the second threshold may be determined based on an object type associated with the second object. In some examples, the second threshold distance may represent a determination of relevance of the second object to the operation of the vehicle.

The simulation system may be configured to determine one or more locations, trajectories, speeds, accelerations, jerks, yaws, yaw rates, and the like associated with the first simulated object and the second simulated object during the respective periods of time. In various examples, the simulation system determines the locations, trajectories, speeds, accelerations, jerks, yaws, yaw rates, and the like at a periodic time interval (e.g., 0.05 seconds, 0.1 second, 0.2 seconds, etc.) of the respective periods of time associated with the first simulated object and the second simulated object.

At operation 706, the process 700 includes determining a first value of a metric (e.g., performance metric) associated with the object controller controlling the first simulated object for the first period of time and a second value of the metric associated with the object controller controlling the second simulated object for the second period of time. The metric may relate to locations, trajectories, speeds, accelerations, jerks, yaws, yaw rates, and the like. In some examples, the first value of the metric may include one or more differences between locations, trajectories, speeds, accelerations, jerks, yaws, yaw rates, and the like of the first simulated object and the first object. The second value of the metric may include one or more differences between locations, trajectories, speeds, accelerations, jerks, yaws, yaw rates, and the like of the second simulated object and the second object. In some examples, the first value of the metric may be associated with one or more time intervals of the first period of time and the second value of the metric may be associated with one or more time intervals of the second period of time. In at least on example, the first value may include an average and/or maximum value associated differences between the locations, trajectories, speeds, accelerations, jerks, yaws, yaw rates, and the like of the first simulated object and the first object during the first period of time and the second value may include an average and/or maximum value associated differences between the locations, trajectories, speeds, accelerations, jerks, yaws, yaw rates, and the like of the second simulated object and the second object during the second period of time.

At operation 708, the process 700 includes determining whether an average and/or maximum of the first value of the metric and the second value of the metric satisfies a threshold. In some examples, the threshold may be associated with a particular time interval, a particular simulation, and/or a plurality of simulations. The threshold may be determined based on the object controller and/or portion thereof to be evaluated. In some examples, the threshold may be determined based on an object type associated with the first object and/or the second object (e.g., corresponding to the metric). In at least one example, the threshold may include a threshold distance between simulated locations and actual locations at various times during the simulation. For example, the threshold distance may include a maximum distance between a simulated object location of the first simulated object and an actual object location of the first object.

Based on a determination that the average and/or maximum value of the metric does not satisfy the threshold ("No" at operation 708), the process 700, at operation 710 includes identifying an error associated with the object controller. In some examples, the simulation system may be configured to determine a portion of the object controller associated with the error. In some examples, the simulation system may be configured to determine an object type associated with the error.

At operation 712, the process 700 includes providing an indication of the error via a display of a computing device. In some examples, the computing device may be associated with the request and/or instruction to evaluate the object controller. In such examples, the simulation system may be configured to send the indication of the error to the requesting computing device, such as via electronic mail, an application, a pop-up notification on a user interface, or the like. In various examples, the indication of the error may include an indication of invalidity, evaluation results, metrics, detected differences in movement between the simulated object and the object, and/or other information about the simulation and/or other simulations of the plurality of simulations.

Based on a determination that the average and/or maximum value of the metric satisfies the threshold ("Yes" at operation 708), the process 700, at operation 714 includes determining whether the threshold number of simulations have been performed. In some examples, the threshold number of simulations may be determined based on the log associated with the data. In such examples, the threshold number may be determined based on a length of time of the log and/or a time associated with each simulation (e.g., 20 seconds, 30 seconds, 60 seconds, 2 minutes, etc.). In some examples, the threshold number may be determined based on lengths of time associated with two or more logs used in the evaluation of the object controller.

In some examples, the threshold number may include a pre-determined number of simulations (e.g., 60, 83, 113, etc.) used in the evaluation of a particular object controller. In some examples, the threshold number may be determined based on the particular object controller and/or portion thereof to be evaluated. In such examples, the simulation system may determine threshold number based on the particular object controller and/or the portion thereof to be evaluated. For example, the evaluation may include an evaluation of the performance of the object controller to control a particular type of object. The threshold number of simulations may be determined based on the particular type of object. In some examples, the threshold number may be determined based on a scenario associated with the evaluation. In such examples, the simulation system may determine the scenario to be evaluated and may determine the number of simulations associated therewith.

Based on a determination that the threshold number of simulations have not yet been performed ("No" at operation 714), the simulation system may generate a second simulation for evaluating the object controller, such as that described above at operation 702. Based on a determination that the threshold number of simulations have been performed ("Yes" at operation 714), the simulation system, at operation 716 may validate the object controller. In various examples, based on a determination that the object control is valid, the simulation system may cause the object controller to control one or more smart objects in additional simulations generated to evaluate a performance of a vehicle controller (e.g., autonomous vehicle controller). As discussed above, in some examples, the simulation system may cause an indication of validation to be presented, such as via the display of the computing device. The indication of validation may include evaluation results associated with the evaluation of the object controller.

Figure 8:
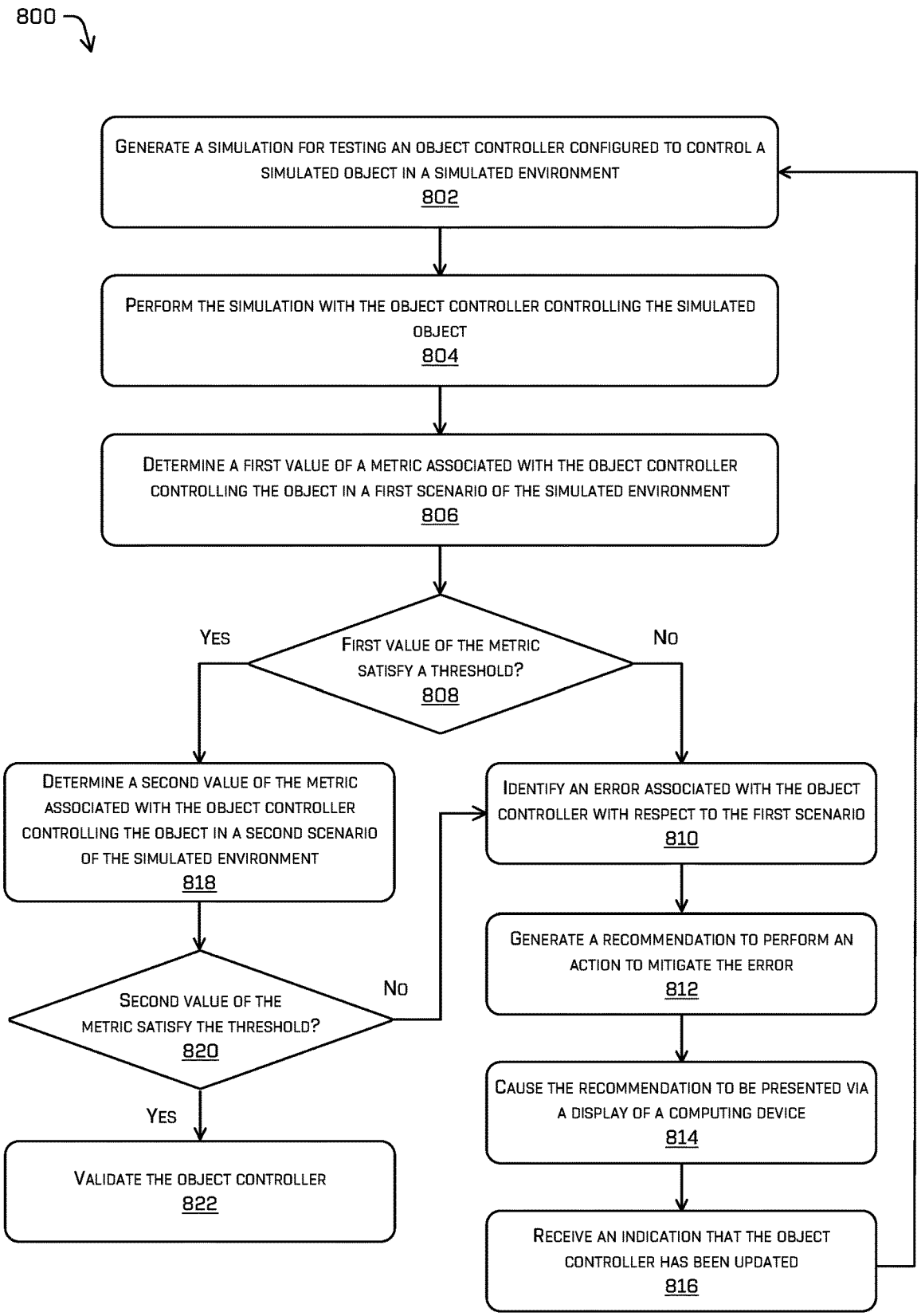
FIG. 8 depicts an example process for validating an object controller based at least in part on a performance of the object controller in controlling a simulated object in a particular scenario, in accordance with examples of this disclosure.

FIG. 8 depicts an example process 800 for validating an object controller based at least in part on a performance of the object controller in controlling a simulated object in a particular scenario, in accordance with examples of this disclosure. Some or all of the process 800 may be performed by the simulation system 106 of FIG. 1 and/or by the computing device(s) 334 of FIG. 3.

At operation 802, the process 800 includes generating a simulation for testing an object controller configured to control a simulated object in a simulated environment. As discussed above, the simulation may be generated based on data (e.g., log data) associated with an operation of a vehicle. In such examples, the simulated object may represent an object detected by a vehicle computing system of the vehicle in a physical environment associated with the operation of the vehicle. In various examples, the simulation system may determine the log (e.g., vehicle trip) associated with the simulation based on a particular scenario in which the object controller is to be evaluated.

As discussed above, the simulation system may generate the simulation responsive to receiving a request and/or instruction to evaluate the performance of the object controller. In some examples, the simulation system may identify the particular scenario to be tested based at least in part on information provided in the request and/or instruction. For example, the request may include a request to evaluate the performance of the object controller in the particular scenario. Additionally or alternatively, the request may include a request to evaluate the object controller in controlling a particular object type associated with the object. In some examples, the simulation system may identify the log to use for the simulation based in part on the particular object type.

The simulation may include the vehicle operating in playback, such as that based on the data (e.g., actual movement in the physical environment) and the simulated object (e.g., smart object) that represents the object detected in the physical environment. In some examples, the simulation may additionally include one or more playback objects, such as playback object 104(3) of FIG. 1. The playback object(s) may include simulated object(s) that operate in the simulated environment based on the data. In some examples, the simulation system may determine a number of smart objects to include in the simulation based on the object controller and/or portion thereof to be evaluated.

At operation 804, the process 800 includes performing the simulation with the object controller controlling the simulated object. The simulation system may perform or run the simulation for a period of time associated with the simulation. The simulation system may control the object according to one or more parameters, such as those described above. The parameter(s) may include default parameters, parameters based on an object type, parameters associated with an observed object behavior of the object, and the like.

The simulation system may be configured to determine one or more locations, trajectories, speeds, accelerations, jerks, yaws, yaw rates, and the like associated with simulated object. In various examples, the simulation system determines the locations, trajectories, speeds, accelerations, jerks, yaws, yaw rates, and the like at a periodic time interval (e.g., 0.05 seconds, 0.1 second, 0.2 seconds, etc.) throughout the simulation.

At operation 806, the process 800 includes determining a first value of a metric associated with the object controller controlling the simulated object in a first scenario of the simulated environment. As discussed above, the metric may be associated with locations, trajectories, velocities, accelerations, yaws, and/or yaw rates associated with the object and the associated object. In some examples, values of the metric (e.g., the first value of the metric) may be associated with differences in locations of the simulated object (e.g., simulated object locations) and the object (e.g., actual object locations) and/or differences in values associated with the actual trajectory of the object and the simulated object trajectory (e.g., difference in speed, direction of travel, acceleration, jerk, etc.). For example, the first value of the metric may include a distance between a simulated object location and a corresponding actual object location. In various examples, the simulation computing system may determine the metrics associated with the performance of the object controller at one or more of the time intervals described above. For example, the first value of the metric may include an average and/or maximum distance between one or more simulated object locations and one or more actual object locations at respective time intervals.

At operation 808, the process 800 includes determining whether the first value of the metric satisfies a threshold. In some examples, the threshold may be associated with a particular time interval, a simulation, and/or a plurality of simulations. The threshold may be determined based on the object controller and/or portion thereof to be evaluated. In some examples, the threshold may be determined based on an object type associated with the object corresponding to the metric. In some examples, the threshold may be determined based on the first scenario associated with the first value of the metric. In at least one example, the threshold may include a threshold distance between an actual object location and a simulated object location.

Based on a determination that the first value of the metric does not satisfy the threshold ("No" at operation 808), the process 800, at operation 810 includes identifying an error associated with the object controller with respect to the first scenario. A determination that the first value of the metric does not satisfy the threshold may represent that the simulated object deviated more than a threshold from what the object (e.g., human) did. In some examples, the simulation system may be configured to determine a portion of the object controller associated with the error, such as the portion of the object controller associated with making control decisions associated with the first scenario. In various examples, the first value of the metric may include an average and/or maximum value of two or more values of the metric associated with two or more time intervals associated with the first scenario.

At operation 812, the process 800 includes generating a recommendation to perform an action to mitigate the error. In some examples, the recommendation may include an indication of the error associated with the first scenario. In some examples, the recommendation may include one or more actions to perform to mitigate the error. In such examples, the simulation system may be configured to determine mitigating actions based at least in part on the error. In various examples, the simulation system may utilize one or more of machine learning techniques, heuristics, and statistical analysis in the mitigating action determination.

In various examples, the simulation system may be configured to evaluate information associated with the operational control of the simulated object (e.g., debug information) to determine planning decisions associated with the control of the simulated object (e.g., why the object controller controlled the simulated object in the way that it did). In such examples, the simulation system may generate the recommendation based on the planning decisions. In some examples, the mitigating action may include a modification to one or more of the planning decisions associated with the simulated object control.

Additionally or in the alternative, the simulation system may be configured to determine one or more parameters associated with the simulated object control that correspond to the error. In some examples, the mitigating action may include a modification to the parameter(s).

At operation 814, the process 800 includes causing the recommendation to be presented via a display of a computing device. In some examples, the computing device may be associated with a received request and/or instruction to evaluate the object controller. In some examples, the recommendation may be provided via email, text message, pop-up notification (e.g., via a native or web-based application), or the like. In various examples, the recommendation may be provided via a user interface associated with object controller validation, such as a user interface associated with initiating an evaluation of the object controller.

At operation 816, the process 800 includes receiving an indication that the object controller has been updated. In various examples, the indication may be received from the computing device to which the recommendation was provided (e.g., computing device associated with the request, a computing device including the user interface associated with object controller validation, etc.). The update may include a second request and/or instruction to evaluate the object controller.

In various examples, based in part on receiving the indication that the object controller has been updated, the process 800 may include generating a second simulation for testing the object controller, such as that described with respect to operation 802.

Based on a determination that the first value of the metric satisfies the threshold ("Yes" at operation 808), the process 800, at operation 818 includes determining a second value of the metric associated with the object controller controlling the object in a second scenario of the simulated environment. The second scenario may include a same type or a different type of scenario as the first scenario. In various examples, the second value of the metric may include an average and/or maximum value of two or more values of the metric associated with two or more time intervals associated with the second scenario.

At operation 820, the process 800 includes determining whether the second value of the metric satisfies the threshold. The threshold may include a same or a different threshold applied to the first value of the metric at operation 808. In some examples, the threshold may be determined based on the second scenario associated with the second value of the metric.

Based on a determination that the second value of the metric does not satisfy the threshold ("No" at operation 820), the process 800, includes identifying an error associated with the object controller, such as that described with respect to operation 810. Based on a determination that the second value of the metric satisfies the threshold ("Yes" at operation 820), the process 800, at operation 822, includes validating the object controller. In various examples, based on a determination that the object control is valid, the simulation system may cause the object controller to control one or more smart objects in additional simulations generated to evaluate a performance of a vehicle controller (e.g., autonomous vehicle controller). As discussed above, in some examples, the simulation system may cause an indication of validation to be presented, such as via the display of the computing device. The indication of validation may include evaluation results associated with the evaluation of the object controller.

Example Clauses

A: A system comprising: one or more processors; and memory storing processor-executable instructions that, when executed by the one or more processors, configure the system to: access data associated with an operation of a vehicle in a physical environment proximate an object; determine, based at least in part on the data, that an object is within a threshold distance of the vehicle; generate a simulation based at least in part on the data, wherein the simulation comprises a simulated object that represents the object in the physical environment, and wherein the simulated object is included in the simulation based on the object being within the threshold distance of the vehicle; perform the simulation with an object controller controlling the simulated object in a simulated environment; determine, based at least in part on an operation of the simulated object, a value of a metric associated with the object controller, the metric being associated with a state or operation of the simulated object; determine that the value of the metric is equal to or less than a threshold value; and validating the object controller based at least in part on determining that the value of the metric is equal to or less than the threshold value.

B: The system of paragraph A, wherein the metric relates to locations of the simulated object in the simulated environment, the instructions further configuring the system to: determine a first simulated object location associated with the simulated object at a first time; determine, based at least in part on the data, a first object location associated with the object at the first time; and determine a distance between the first object location and the first simulated object location, wherein the value of the metric is based at least in part on the distance between the first object location and the first simulated object location.

C: The system of either paragraph A or paragraph B, the instructions further configure the system to: determine an object type associated with the object; determine, based at least in part on the object type, a parameter associated with permitted movements of the simulated object; and cause the object controller to control the simulated object based at least in part on the parameter.

D: The system of any one of paragraphs A-C, wherein the value of the metric is a first value, the simulation is a first simulation, and the instructions further configure the system to: generate a second simulation based at least in part on the data, wherein the second simulation comprises a second period of time associated with the operation of the vehicle that is different from a first period of time associated with the first simulation; cause the object controller to control a second simulated object for at least a portion of the second period of time in the second simulation; determine a second value of the metric associated with the object controller controlling the second simulated object in the second simulation; and determine a total value of the metric associated with the object controller based at least in part on the first value of the metric and the second value of the metric, wherein validating the object controller is based at least in part on the total value of the metric.

E: The system of any one of paragraphs A-D, wherein the instructions further configure the system to: receive a request to evaluate a performance of a second object controller; in response to receiving the request, generate a second simulation based at least in part on the data; perform the second simulation with the second object controller controlling a second simulated object in the second simulation; determine a second value of the metric associated with control of the second simulated object; determine that the second value of the metric exceeds the threshold value; and output an indication of an error associated with the second object controller.

F: A method comprising: performing a simulation with an object controller controlling a simulated object in a simulated environment, wherein the simulated object represents an object in a physical environment; determining a level of deviation between the simulated object in the simulated environment and the object in the physical environment; determining, based on the level of deviation, that a value of a metric associated with the object controller controlling the simulated object is equal to or less than a threshold value; and validating the object controller based at least in part on determining that the value of the metric is equal to or less than the threshold value.

G: The method of paragraph F, wherein the metric relates to locations of the simulated object in the simulated environment, the method further comprising: determining, based at least in part on the data, a first object location associated with the object at a first time; determining a first simulated object location associated with the simulated object at the first time; and determining a distance between the first object location and the first simulated object location, wherein the value of the metric is based at least in part on the distance.

H: The method of either paragraph F or paragraph G, further comprising: determining a first value of the metric at a first time in the simulation and a second value of the metric at a second time in the simulation; and calculating an average value of the metric based at least in part on the first value and the second value, wherein the value of the metric comprises the average value.

I: The method of any one of paragraphs F-H, further comprising: determining an object type associated with the object; determining, based at least in part on the object type, a parameter associated with permitted movements of the simulated object; and causing the object controller to control the simulated object based at least in part on the parameter.

J: The method of any one of paragraphs F-I, further comprising: receiving a request to evaluate a performance of a second object controller; in response to receiving the request, generating a second simulation based at least in part on the data; performing the second simulation with the second object controller controlling a second simulated object in the second simulation; determining a second value of the metric associated with control of the second simulated object; determining that the second value of the metric exceeds the threshold value; and outputting an indication of an error associated with the second object controller.

K: The method of any one of paragraphs F-J, further comprising: determining an update to a component of the object controller; identifying a parameter associated with the component; and determining the threshold value based at least in part on the parameter.

L: The method of any one of paragraphs F-K, wherein the metric relates to at least one of: a location of the simulated object; a velocity of the simulated object; an acceleration of the simulated object; a jerk of the simulated object; a yaw of the simulated object; or a yaw rate of the simulated object.

M: The method of any one of paragraphs F-L, further comprising: receiving an indication of a component of the object controller to be evaluated; identifying a scenario associated with the component; and identifying a log of the vehicle that is associated with the scenario, wherein the data represents the operation of the vehicle during the log, wherein the simulation is generated based at least in part on the scenario.

N: The method of paragraph M, wherein the component comprises at least one of: a vehicle controller; a train controller; a pedestrian controller; a bicycle controller; a moped controller; a pedicab controller; or a streetcar controller.

O: A system or device comprising: a processor; and a non-transitory computer-readable medium storing instructions that, when executed, cause a processor to perform a computer-implemented method as any one of paragraphs F-N describe.

P: A system or device comprising: a means for processing; and a means for storing coupled to the means for processing, the means for storing including instructions to configure one or more devices to perform a computer-implemented method as any one of paragraphs F-N describe.

Q: One or more non-transitory computer-readable media storing instructions that, when executed, cause one or more processors to perform operations comprising: performing a simulation with an object controller controlling a simulated object in a simulated environment, wherein the simulated object represents an object in a physical environment; determining a level of deviation between the simulated object in the simulated environment and the object in the physical environment; determining, based on the level of deviation, that a value of a metric associated with the object controller controlling the simulated object is equal to or less than a threshold value; and validating the object controller based at least in part on determining that the value of the metric is equal to or less than the threshold value.

R: The one or more non-transitory computer-readable media of paragraph Q, wherein the metric relates to at least one of: a location of the simulated object; a velocity of the simulated object; an acceleration of the simulated object; a jerk of the simulated object; a yaw of the simulated object; or a yaw rate of the simulated object.

S: The one or more non-transitory computer-readable media of either paragraph Q or paragraph R, the operations further comprising: determining a first value of the metric at a first time in the simulation and a second value of the metric at a second time in the simulation; and calculating an average value of the metric based at least in part on the first value and the second value, wherein the value of the metric comprises the average value.

T: The one or more non-transitory computer-readable media of any one of paragraphs Q-S, the operations further comprising: determining an object type associated with the object; determining, based at least in part on the object type, a parameter associated with the simulated object; and causing the object controller to control the simulated object based at least in part on the parameter.

U: The one or more non-transitory computer-readable media of any one of paragraphs Q-T, the operations further comprising receiving a request to evaluate a performance of a component of the object controller, wherein the component comprises at least one of: a vehicle controller; a train controller; a pedestrian controller; a bicycle controller; a moped controller; a pedicab controller; or a streetcar controller.

V: The one or more non-transitory computer-readable media of any one of paragraphs Q-U the operations further comprising: receiving a request to evaluate a performance of the object controller with respect to a scenario; identifying a log of the vehicle that is associated with the scenario, wherein the data represents the operation of the vehicle during the log; and accessing the data for generating the simulation based at least in part on the log.

While the example clauses described above are described with respect to one particular implementation, it should be understood that, in the context of this document, the content of the example clauses may also be implemented via a method, device, system, a computer-readable medium, and/or another implementation. Additionally, any of examples A-V may be implemented alone or in combination with any other one or more of the examples A-V.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
non-transitory memory storing processor-executable instructions that, when executed by the one or more processors, configure the system to:
  access, from a database, log data associated with an operation of a vehicle in a physical environment proximate a first object and a second object in the physical environment;
  determine, based at least in part on the log data, that the first object and the second object are within a first threshold distance of the vehicle in the physical environment;
  generate, based at least in part on the log data, a simulation comprising a first simulated object representing the first object and a second simulated object representing the second object,
  wherein the first simulated object is included in the simulation based on the first object being within the first threshold distance of the vehicle in the physical environment and the second simulated object is included in the simulation based on the second object being within the first threshold distance of the vehicle in the physical environment;
  further wherein the simulation is configured to evaluate a performance of a vehicle controller;
  perform the simulation with an object controller controlling the first simulated object in a simulated environment based at least in part on the first object also being within a second threshold distance of the vehicle in the physical environment, wherein the object controller is configured to at least modify a trajectory of the first simulated object such that the trajectory of the first simulated object deviates from the log data;
  determine, based at least in part on an operation of the first simulated object, a value of a metric associated with the object controller, the metric being associated with a state or operation of the first simulated object, wherein the value of the metric is associated with a first simulated object type and a second simulated object type that is different than the first simulated object type, wherein the value of the metric is an average metric between a first metric associated with the first simulated object type and a second metric associated with the second simulated object type;
  determine that the value of the metric is equal to or less than a threshold value;
    validate the object controller based at least in part on determining that the value of the metric is equal to or less than the threshold value;
    cause the object controller to evaluate the performance of the vehicle controller; and
    controlling a real-world autonomous vehicle based at least in part on an evaluated vehicle controller.

2. The system of claim 1, wherein the metric relates to locations of the first simulated object in the simulated environment, the instructions further configuring the system to:
  determine a first simulated object location associated with the first simulated object at a first time;
  determine, based at least in part on the log data, a first object location associated with the first object at the first time; and
  determine a distance between the first object location and the first simulated object location,
  wherein the value of the metric is based at least in part on the distance between the first object location and the first simulated object location.

3. The system of claim 1, wherein the instructions further configure the system to:
  determine an object type associated with the first object;
  determine, based at least in part on the object type, a parameter associated with permitted movements of the first simulated object; and
  cause the object controller to control the first simulated object based at least in part on the parameter.

4. The system of claim 1, wherein the value of the metric is a first value, the simulation is a first simulation, and the instructions further configure the system to:
  generate a second simulation based at least in part on the log data, wherein the second simulation comprises a second period of time associated with the operation of the vehicle that is different from a first period of time associated with the first simulation;
  cause the object controller to control the first simulated object for at least a portion of the second period of time in the second simulation;
  determine a second value of the metric associated with the object controller controlling the first simulated object in the second simulation; and
  determine a total value of the metric associated with the object controller based at least in part on the first value of the metric and the second value of the metric,
  wherein validating the object controller is based at least in part on the total value of the metric.

5. The system of claim 1, wherein the instructions further configure the system to:
  receive a request to evaluate a performance of a second object controller;
  in response to receiving the request, generate a second simulation based at least in part on the log data;
  perform the second simulation with the second object controller controlling the first simulated object in the second simulation;
  determine a second value of the metric associated with control of the first simulated object;
  determine that the second value of the metric exceeds the threshold value; and
  output an indication of an error associated with the second object controller.

6. A method comprising:
  receiving log data;
  determining that the log data includes an object in a physical environment that is within a first threshold distance of a vehicle;
  generating, based at least in part on the log data and the object in the physical environment being within the first threshold distance of the vehicle, a simulation configured to evaluate a performance of a vehicle controller;
  performing, based at least in part on the object in the physical environment also being within a second threshold distance of the vehicle, the simulation with an object controller controlling a simulated object in a simulated environment, wherein the simulated object represents the object in the physical environment and the object controller is configured to modify a characteristic of the simulated object such that the characteristic of the simulated object deviates from the log data;
  determining a level of deviation between the simulated object in the simulated environment and the object in the physical environment;
  determining, based on the level of deviation, that a value of a metric associated with the object controller controlling the simulated object is equal to or less than a threshold value, wherein the value of the metric is associated with a first simulated object type and a second simulated object type that is different than the first simulated object type, wherein the value of the metric is an average metric between a first metric associated with the first simulated object type and a second metric associated with the second simulated object type;
  validating the object controller based at least in part on determining that the value of the metric is equal to or less than the threshold value;
  causing the object controller to evaluate the performance of the vehicle controller; and
  controlling a real-world autonomous vehicle based at least in part on an evaluated vehicle controller.

7. The method of claim 6, wherein the metric relates to locations of the simulated object in the simulated environment, the method further comprising:
  determining, based at least in part on data associated with an operation of the vehicle proximate the object in the physical environment, a first object location associated with the object in the physical environment at a first time;
  determining a first simulated object location associated with the simulated object at the first time; and
  determining a distance between the first object location and the first simulated object location, wherein the value of the metric is based at least in part on the distance.

8. The method of claim 6, further comprising:
determining a first value of the metric at a first time in the simulation and a second value of the metric at a second time in the simulation; and
calculating an average value of the metric based at least in part on the first value and the second value,
wherein the value of the metric comprises the average value.

9. The method of claim 6, further comprising:
determining an object type associated with the object in the physical environment;
determining, based at least in part on the object type, a parameter associated with permitted movements of the simulated object; and
causing the object controller to control the simulated object based at least in part on the parameter.

10. The method of claim 6, further comprising:
receiving a request to evaluate a performance of a second object controller;
in response to receiving the request, generating a second simulation based at least in part on data associated with an operation of the vehicle proximate the object in the physical environment;
performing the second simulation with the second object controller controlling a second simulated object in the second simulation;
determining a second value of the metric associated with control of the second simulated object;
determining that the second value of the metric exceeds the threshold value; and
outputting an indication of an error associated with the second object controller.

11. The method of claim 6, further comprising:
determining an update to the object controller;
identifying a parameter associated with the object controller; and
determining the threshold value based at least in part on the parameter.

12. The method of claim 6, wherein the metric relates to at least one of:
a location of the simulated object;
a velocity of the simulated object;
an acceleration of the simulated object;
a jerk of the simulated object;
a yaw of the simulated object; or
a yaw rate of the simulated object.

13. The method of claim 6, further comprising:
receiving an indication to evaluate the object controller;
identifying, based at least in part on the indication, a scenario associated with the object controller;
identifying a log of the vehicle that is associated with the scenario; and
accessing data for generating the simulation based at least in part on the log, wherein the data represents an operation of the vehicle during the log.

14. The method of claim 13, wherein the object controller comprises at least one of:
a second vehicle controller;
a train controller;
a pedestrian controller;
a bicycle controller;
a moped controller;
a pedicab controller; or
a streetcar controller.

15. One or more non-transitory computer-readable media storing instructions that, when executed, cause one or more processors to perform operations comprising:
receiving log data;
determining that the log data includes an object in a physical environment that is within a first threshold distance of a vehicle;
generating, based at least in part on the log data and the object in the physical environment being within the first threshold distance of the vehicle, a simulation configured to evaluate a performance of a vehicle controller;
performing, based at least in part on the object in the physical environment also being within a second threshold distance of the vehicle, the simulation with an object controller controlling a simulated object in a simulated environment, wherein the simulated object represents the object in the physical environment and the object controller is configured to modify a characteristic of the simulated object such that the characteristic of the simulated object deviates from the log data;
determining a level of deviation between the simulated object in the simulated environment and the object in the physical environment;
determining, based on the level of deviation, that a value of a metric associated with the object controller controlling the simulated object is equal to or less than a threshold value, wherein the value of the metric is associated with a first simulated object type and a second simulated object type that is different than the first simulated object type, wherein the value of the metric is an average metric between a first metric associated with the first simulated object type and a second metric associated with the second simulated object type;
validating the object controller based at least in part on determining that the value of the metric is equal to or less than the threshold value;
causing the object controller to evaluate the performance of the vehicle controller; and
controlling a real-world autonomous vehicle based at least in part on an evaluated vehicle controller.

16. The one or more non-transitory computer-readable media of claim 15, wherein the metric relates to at least one of:
a location of the simulated object;
a velocity of the simulated object;
an acceleration of the simulated object;
a jerk of the simulated object;
a yaw of the simulated object; or
a yaw rate of the simulated object.

17. The one or more non-transitory computer-readable media of claim 15, the operations further comprising:
determining a first value of the metric at a first time in the simulation and a second value of the metric at a second time in the simulation; and
calculating an average value of the metric based at least in part on the first value and the second value,
wherein the value of the metric comprises the average value.

18. The one or more non-transitory computer-readable media of claim 15, the operations further comprising:
determining an object type associated with the object in the physical environment;
determining, based at least in part on the object type, a parameter associated with the simulated object; and
causing the object controller to control the simulated object based at least in part on the parameter.

19. The one or more non-transitory computer-readable media of claim 15, the operations further comprising receiving a request to evaluate a performance of the object controller, wherein the object controller comprises at least one of:
- a second vehicle controller;
- a train controller;
- a pedestrian controller;
- a bicycle controller;
- a moped controller;
- a pedicab controller; or
- a streetcar controller.

20. The one or more non-transitory computer-readable media of claim 15, the operations further comprising:
- receiving a request to evaluate a performance of the object controller with respect to a scenario;
- identifying a log of the vehicle that is associated with the scenario; and
- accessing data for generating the simulation based at least in part on the log, wherein the data represents an operation of the vehicle during the log.

\* \* \* \* \*